United States Patent [19]

Hinshaw et al.

[11] 4,278,598

[45] Jul. 14, 1981

[54] POSITIVE-WORKING IMMOBILE INTRAMOLECULAR NUCLEOPHILIC DISPLACEMENT COMPOUNDS AND PHOTOGRAPHIC ELEMENTS CONTAINING SAME

[75] Inventors: Gerald C. Hinshaw, Penfield; Paul B. Condit, Pittsford, both of N.Y.

[73] Assignee: Eastman Kodak Company, Rochester, N.Y.

[21] Appl. No.: 719,643

[22] Filed: Sep. 1, 1976

Related U.S. Application Data

[60] Division of Ser. No. 534,966, Dec. 20, 1974, Pat. No. 4,199,354, which is a continuation-in-part of Ser. No. 326,628, Jan. 26, 1973, abandoned.

[51] Int. Cl.[3] .................... C09B 29/26; C09B 29/28; C09B 29/36

[52] U.S. Cl. .................................. 260/157; 260/199; 260/206; 260/207; 260/207.1; 548/243; 548/251; 560/13; 560/20; 562/434

[58] Field of Search ....................................... 260/157

[56] References Cited

U.S. PATENT DOCUMENTS

| | | | |
|---|---|---|---|
| 2,846,307 | 8/1958 | Woolley | 96/55 |
| 2,983,608 | 5/1961 | Beavers | 260/163 X |
| 3,148,062 | 9/1964 | Whitmore et al. | 260/197 X |
| 3,185,567 | 5/1965 | Rogers | 96/3 |
| 3,241,963 | 3/1966 | Green et al. | 96/29 |
| 3,245,790 | 4/1966 | Downey et al. | 96/29 |
| 3,347,672 | 10/1967 | Downey et al. | 96/29 |
| 3,443,939 | 5/1969 | Bloom et al. | 96/3 |
| 3,443,940 | 5/1969 | Bloom et al. | 96/3 |
| 3,590,692 | 7/1971 | Bloom | 96/26 |
| 3,674,478 | 7/1972 | Grasshoff et al. | 96/3 |
| 3,728,113 | 4/1973 | Becker et al. | 96/3 |
| 3,751,406 | 8/1973 | Bloom | 260/162 |
| 3,854,945 | 12/1974 | Bush et al. | 96/29 |
| 3,880,658 | 4/1975 | Lestina et al. | 96/29 |
| 3,928,312 | 12/1975 | Fleckenstein | 260/156 |

FOREIGN PATENT DOCUMENTS

| | | | |
|---|---|---|---|
| 1157503 | 7/1969 | United Kingdom | 96/3 |

OTHER PUBLICATIONS

Cohen et al., J. Org. Chem., vol. 37, No. 5, pp. 741–744 (1972).

Hutchins et al., J. Am. Chem. Soc., vol. 95, No. 7, pp. 2282–2286 (1973).

*Primary Examiner*—Floyd D. Higel
*Attorney, Agent, or Firm*—Joshua G. Levitt

[57] ABSTRACT

Novel photographic dye release compounds have the structure:

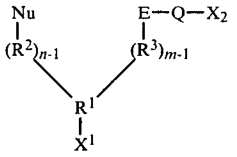

wherein $R^1$ is an aromatic group containing 5–7 members in the ring to which Nu and E are attached; $R^2$ and $R^3$ are bivalent organic groups containing from 1–3 atoms in the bivalent linkage which are alkylene, oxyalkylene or thiaalkylene; Nu is a nucleophilic group which is a hydrazine, an hydroxyamino, an hydroxy, a sulfonamido, a primary amino or alkali-labile precursors for said nucleophilic groups; E is an electrophilic group which is a carbonyl or a sulfonyl; Q is a bivalent group providing a mono atom linkage between E and $X_2$ and is amino providing a mono atom nitrogen linkage, an oxygen atom, a sulfur atom or a selenium atom, provided that Nu and E are positioned on a ring of said aromatic group to provide for intramolecular formation of a 5- to 7-membered ring between Nu and E displacing Q—$X_2$ from E; one of $X^1$ or Q—$X_2$ is a ballasting group containing at least 8 carbon atoms, which ballasting group is of a size sufficient to render said compound immobile in an alkaline solution-permeable layer of a photographic element; one of $X^1$ or Q—$X_2$ is an azo dye, an azomethine dye; an anthraquinone dye, an alizarin dye, a merocyanine dye, a quinoline dye or a cyanine dye; and n and m are integers of 1 or 2.

34 Claims, No Drawings

POSITIVE-WORKING IMMOBILE INTRAMOLECULAR NUCLEOPHILIC DISPLACEMENT COMPOUNDS AND PHOTOGRAPHIC ELEMENTS CONTAINING SAME

This application is a division of U.S. Ser. No. 534,966 filed Dec. 20, 1974, now U.S. Pat. No. 4,199,354 issued Apr. 22, 1980, which in turn is a continuation-in-part of Ser. No. 326,628 filed Jan. 26, 1973, now abandoned.

This invention relates to new compounds, photographic elements and processes of forming image records in photographic elements. In one aspect, this invention relates to image dye-providing materials which are immobile or ballasted compounds as incorporated into photographic elements. In another aspect, this invention relates to dye image-providing materials which can be used in image-transfer film units.

It is known in the art to use image dye-providing materials in photographic elements such as image-transfer film units. Image dye-providing materials which are initially mobile in the film units have been employed, for example, such as the mobile couplers and developers disclosed in Land, U.S. Pat. No. 2,698,244 issued Dec. 28, 1954, where a dye is synthesized in the receiver layer. Preformed mobile dyes which reacted with mobile oxidized color developers are disclosed in U.S. Pat. No. 2,774,668. Further disclosures of the use of mobile preformed dyes are found in Rogers, U.S. Pat. No. 2,983,606 issued May 8, 1961. However, the initially mobile dye image-providing materials have certain disadvantages in photographic elements: they can diffuse prematurely to adjacent layers affecting interimage color reproduction and they remain reactive when diffusing through adjacent layers after development where they can react to cause drop-off in color scales, and the like.

Image dye-providing materials which are initially immobile in a photographic element or are ballasted overcome several of the problems with initially mobile compounds. The dyes could be temporarily ballasted by a heavy counter ion such as a barium salt as disclosed in Yutzy, U.S. Pat. No. 2,756,142 issued July 24, 1956. The dyes can contain a removable ballast group as described in Whitmore, Canadian Pat. No. 602,607 issued August 2, 1960, U.S. Pat. Nos. 3,227,552 by Whitmore issued January 4, 1966, 3,628,952 and the like. Compounds which undergo intramolecular ring closure upon oxidation to split off a dye are disclosed in U.S. Pat. Nos. 3,443,939, 3,443,940 and 3,443,941, all issued May 13, 1969. Improved initially immobile compounds which undergo a redox reaction followed by alkali cleavage to split off a dye or dye precursor moiety are disclosed in Fleckenstein et al, published U.S. Ser. No. B351,673 filed Apr. 16, 1973. However, these image dye-providing materials are generally limited in application by the fact that the dye is released in the areas where oxidation takes place. Thus, direct-positive silver halide emulsions or some other reversing mechanism, such as use of development nuclei in layers adjacent the recording layer, are used if a positive transfer image is desired.

It would be desirable to provide an image dye-providing material which is initially immobile or ballasted in a photographic element to prevent premature movement, and have this material function to provide a positive transfer image with a simple negative silver halide emulsion. Moreover, it would be desirable to provide an image dye-providing material wherein the diffusing material is relatively inert to further reaction in the photographic element after it is released from the parent compounds.

We have now discovered a new class of compounds which can be used in photographic elements and in processes for producing image records which overcome many inherent limitations of the systems known in the art. These compounds are immobile or ballasted compounds which can undergo a reaction such as a nucleophilic displacement reaction in their reduced form to release a mobile and diffusible photographically useful group. The compounds can be oxidized, such as by a redox reaction in a photographic element, to lower substantially the rate of release of said photographically useful groups. Thus, the compounds can be used to provide a positive transfer image from negative silver halide emulsions. In certain embodiments, the compound contains an image dye-providing moiety which is released upon nucleophilic displacement to provide a mobile image dye-providing substance.

Generally, the photographic elements of this invention comprise a support having thereon at least one alkali-permeable layer comprising an immobile compound which contains a photographically useful moiety, said immobile compound when under alkaline conditions being capable of releasing said photographically useful group and being capable of reaction with an oxidized silver halide developing agent before substantial release of said photographically useful group occurs, to lower substantially the rate of release of said photographically useful group.

Where the compounds of this invention are used in photographic elements, they generally have a rate of release of the photographically useful group which is slower than the rate at which they react with oxidized silver halide developing agent, but faster than the rate of fog formation in the unexposed areas of the photographic element. The rate of fog formation can be controlled by using slowly developing silver halide emulsions or the use of addenda which restrain or suppress further development after the initial imagewise development has occurred. Typical useful addenda to suppress further development include the antifoggants, development restrainers and hydrolyzable precursors thereof.

In one embodiment, the compounds of this invention are organic compounds which contain (1) an oxidizable nucleophilic group or a precursor for an oxidizable nucleophilic group and (2) an electrophilic cleavage group which is located between a moiety which is a photographically useful group and another moiety of said compound which functions as a ballast for the compound. When the compounds are used in a photographic system, the nucleophilic group functions by reacting at the electrophilic center, displacing the ballast moiety from the photographically useful group of the compound. The photographically useful group upon release from the ballast moiety can then diffuse within the immediate layer, to adjacent layers or to receiving layers where it can carry out its function in the system. However, where the nucleophilic group is oxidized, such as by redox reaction with an oxidized silver halide developer, the electrophilic group remains substantially unaffected by the oxidized nucleophilic group and the photographically useful group remains immobile and nondiffusible in its initial location.

The compounds of this invention are especially useful in photographic systems where the photographically useful group is an image dye-providing group such as a dye or dye precursor. When the compounds are incorporated in a photographic element in association with a silver halide emulsion, the compounds function to provide a positive transfer of image dye-providing substance with a negative silver halide emulsion. Since the compounds are ballasted or immobile as incorporated in the photographic element, additional parameters of control are provided with resultant improved image quality. In certain preferred embodiments, a dye can be released which can diffuse through adjacent layers with a minimum of interaction with silver halide or other compounds in the adjacent layers. Still another advantage is attained in certain embodiments where a shifted or preformed dye can be released from an immobile compound associated with a negative silver halide emulsion to produce an image record without the necessity of oxidation reactions on the receiver sheet, such as is required with oxichromic compounds, leuco compounds, color couplers and the like, which generally require oxidation reactions to provide the image dye.

In one embodiment, this invention relates to new organic compounds which comprise (1) an oxidizable nucleophilic group and (2) an electrophilic cleavage group located between a photographically useful group such as an image dye-providing group and a group which serves as a ballast to render said compound immobile in a photographic element. In certain highly preferred embodiments, the compounds contain a 2,1-benzisoxazolone nucleus.

In another embodiment, this invention relates to photographic elements comprising a support having thereon at least one layer containing a photographic recording material such as silver halide having associated therewith an intramolecular nucleophilic displacement compound. Preferably, the intramolecular nucleophilic displacement compound comprises an image dye-providing group which is a dye, including shifted dyes, or a dye precursor, such as an oxichromic compound or a color coupler and the like.

In a preferred embodiment, this invention relates to photographic elements which comprise a support having thereon a red-sensitive silver halide emulsion having associated therewith an intramolecular nucleophilic displacement compound comprising a cyan image dye-providing moiety, a layer containing a green-sensitive silver halide emulsion having associated therewith an intramolecular nucleophilic displacement compound which comprises a magenta image dye-providing moiety, and a layer containing a blue-sensitive silver halide emulsion having associated therewith an intramolecular nucleophilic displacement compound which comprises a yellow image dye-providing moiety.

In another highly preferred embodiment, this invention relates to image-transfer systems which comprise a silver halide emulsion having associated therewith an intramolecular nucleophilic displacement compound which preferably comprises an image dye-providing moiety which is a preformed dye or a shifted dye.

In a specific embodiment in accordance with this invention, a photographic film unit is provided which is adapted to be processed by passing said unit between a pair of juxtaposed pressure-applying members, such as would be found in a camera designed for in-camera processing. The unit comprises (1) a photosensitive element which contains a silver halide emulsion having associated therewith an immobile intramolecular nucleophilic displacement compound, (2) an image dye-receiving layer, (3) means for discharging an alkaline processing composition within the film unit such as a rupturable container which is adapted to be positioned during processing of the film so that a compressive force applied to the container by the pressure-applying members will effect a discharge of the container's contents within the film, and (4) a silver halide developing agent which is soluble in alkaline processing composition located within said film unit.

In still another embodiment, this invention relates to a new process comprising (1) applying an alkaline processing composition to an imagewise-exposed photographic element comprising a support having thereon at least one layer containing a photographic recording material, such as silver halide, and at least one layer thereon containing a nondiffusible compound having a photographically useful moiety wherein said compound is capable of releasing said photographically useful group under alkaline conditions, and is also capable of reaction with an oxidized developing agent for said photographic recording material, wherein the reaction product has a substantially lower rate of release of the photographically useful group, and (2) providing said developing agent for said photographic recording material during application of said alkaline processing composition under conditions to effect imagewise release of said photographically useful moiety as an inverse function of development of said photographic recording material, whereby an image record is obtained in said photographic element.

In a highly preferred embodiment, this invention relates to a photographic transfer process comprising:

(a) treating a photographic element prepared in accordance with this invention with an alkaline processing composition in the presence of a silver halide developing agent to effect development of each of the exposed silver halide emulsion layers, thereby oxidizing the developing agent;

(b) the oxidized developing agent cross-oxidizing said immobile compound according to this invention as a function of development before substantial release of said photographically useful group occurs whereby said cross-oxidation substantially reduces the rate of release of said photographically useful group;

(c) maintaining said photographic element in an alkaline medium for a time sufficient to release said photographically useful group from the immobile compound which has not reacted with said developing agent; and (d) at least a portion of said photographically useful compound providing a positive image record.

In this embodiment, the photographically useful compound is preferably an image dye or image-dye precursor. The image-transfer process is preferably carried out in an integral negative-receiver image-transfer element where the image-receiving layer and the photographic recording layers are coated on the same support, preferably with an opaque layer and a layer which is reflective to light located between the receiver layer and the recording layers; the alkaline processing composition can be applied between the outer recording layers of the photographic element and a cover sheet which can be transparent and superposed before exposure.

Positive retained images can also be readily obtained in photographic elements of this invention, and especially those elements which contain an immobile compound in accordance with this invention which contains an image dye or dye precursor and a hydrolyzable precursor for a nucleophilic group. The elements can be first developed with a developing agent in an environment having a pH below that necessary to hydrolyze the precursor for said nucleophilic group; then the photographic element can be fogged, light-flashed, etc., and developed in a solution having a pH sufficiently high to effect intramolecular nucleophilic displacement of said immobile compounds.

Generally, the immobile compounds contain a nucleophilic group and an electrophilic group so chosen that, when the compound is incorporated into a photographic element, the rate of oxidation of the nucleophilic group is substantially greater than the rate of intramolecular nucleophilic displacement or cleavage at the electrophilic group. Since the rate of oxidation is substantially greater than the rate of nucleophilic displacement, an imagewise pattern of a more mobile group can be produced after displacement; i.e., where said compound contains an image dye which is diffusible after nucleophilic displacement, image dye can diffuse to layers adjacent the layer of initial location of said compound. Generally, there will be at least twice as much and preferably at least ten times more of said nucleophilic displacement in the unoxidized areas than in the oxidized areas during the development and image-forming process, and preferably there is substantially no nucleophilic displacement in the areas of said photographic element where all of said compound is oxidized. Where dyes or dye precursors are released, generally at least two times and preferably at least five times more dye or dye precursor is released in the unoxidized areas than in the oxidized areas.

The compound of this invention can be characterized as having an oxidizable nucleophilic group or precursor therefor located in said compound relative to an electrophilic cleavage group to provide for intromolecular nucleophilic displacement of a diffusible moiety from said compound, wherein said compound upon oxidation of said nucleophilic group has a substantially lower rate of release of said diffusible moiety in an alkaline medium. Generally, any type of oxidation agent can be used to oxidize or redox with said compound to control release of the diffusible moiety; for example, when the compound is dissolved in an equal weight of a solvent, such as diethyl lauramide, and coated in a hydrophilic colloid layer such as gelatin, it can be reacted in an alkaline medium, such as an aqueous-NaOH medium, having a pH of greater than 12 with a redox agent, such as an oxidized 3-pyrazolidone silver halide developing agent; in the areas where it has been oxidized there will be substantially lower quantities of the diffusible moiety produced. In instances where a diffusible dye is released, the quantity of diffusible dye release can readily be obtained by observing the amount of dye appearing in adjacent layers or by washing the diffusible dye out of the element and observing the density of the retained dye in the oxidized and nonoxidized areas. In essence, the present compounds will exhibit higher amounts of released dye in the unoxidized areas when compared with compounds which release dye subsequent to oxidation, such as the compounds referred to in the introduction of the present specification. The oxidized redox agent can be provided by various means including the reduction of silver halide, imagewise reaction of a uniform distribution or an oxidizing agent, etc. The oxidizing agent and pH condition, however, are generally chosen to achieve oxidation of the nucleophilic group prior to substantial release of the diffusible moiety.

In certain highly preferred embodiments, the compounds of this invention contain a group which is a hydrolyzable precursor for the oxidizable nucleophilic group, for example, a hydrolyzable precursor for an hydroxylamine group. In compounds where the nucleophilic group is blocked, the possibility of premature reactions' releasing the photographically useful moiety is substantially eliminated. Moreover, by controlling the development conditions, the availability of the nucleophilic group for reaction and intramolecular nucleophilic displacement can be delayed, if desired.

In certain preferred embodiments, the compounds of this invention are defined as intramolecular nucleophilic displacement compounds. The term "intramolecular nucleophilic displacement" is understood to refer to a reaction in which a nucleophilic center attached to a compound reacts at another site on said compound, which is an electrophilic center, to effect displacement of a group or atom attached to said electrophilic center. Generally, the intramolecular nucleophilic displacement compounds are those compounds which have the nucleophilic group and the electrophilic center juxtaposed by the three-dimensional configuration of the molecule to promote close proximity of the groups whereby the reaction can take place. Generally, the respective electrophilic and nucleophilic groups can be put on any compound where the groups are held in the possible reaction positions, including polymeric compounds, macrocyclic compounds, polycyclic compounds, enzyme-like structures and the like. However, the nucleophilic groups and electrophilic groups are preferably located on compounds wherein a cyclic organic ring or a transient cyclic organic ring can be easily formed by intramolecular reaction of the nucleophilic group at the electrophilic center. Cyclic groups can be generally formed with 3–7 atoms thereon, and preferably in accordance with this invention the nucleophilic group and the electrophilic group are positioned on a compound where they can form a 3- or 5- to 7-membered ring, and more preferably a 5- or 6-membered ring (4-membered rings are generally known to be difficult to form in organic reactions). Intramolecular nucleophilic displacement occurs with the compounds of this invention when the compound is in the reduced state and the rate of nucleophilic displacement appears to be substantially reduced and preferably eliminated when the nucleophile is oxidized. The mechanism of the above compounds as described is believed to be different in kind from compounds known in the art which are oxidized to provide an electrophilic center with subsequent intramolecular reaction followed by release of a dye.

The compounds of this invention preferably contain the nucleophilic groups and the electrophilic cleavage groups connected through a linkage which can be acyclic, but is preferably a cyclic group to provide more favorable juxtaposition of the groups whereby intramolecular nucleophilic attack on the electrophilic center is favored. In certain highly preferred embodiments, the nucleophilic group and the electrophilic group are both attached to the same aromatic ring structure, which can be a carbocyclic ring structure or a heterocyclic ring structure and includes fused rings wherein each group can be on a different ring; preferably, both groups are attached directly to the same aromatic ring, which is preferably a carbocyclic ring structure.

In certain embodiments, the compounds of this invention contain from 1 to about 5 atoms and preferably 3 or 4 atoms between the nucleophilic center of the oxidizable nucleophilic group and the atom which forms the electrophilic center, whereby the nucleophilic center, taken together with the center of the electrophilic group, is capable of forming a ring or a transient ring having from 3 to 7 atoms therein and preferably 5 or 6 atoms therein.

In certain embodiments, the compounds useful in accordance with this invention have the following structure:

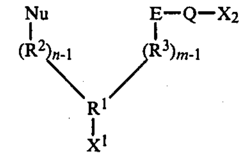

wherein $R_1$ is an acyclic organic group or preferably is a cyclic organic group including bridged-ring groups, polycyclic groups and the like, which preferably have from 5-7 members in the ring to which Nu and E are attached, and is more preferably an aromatic ring, such as a carbocyclic ring, e.g., benzenoid groups, etc., or a heterocyclic ring, including fused rings, substituted aromatic rings and the like, and preferably $R^1$ contains less than 50 atoms and more preferably less than 15 atoms; $R^2$ and $R^3$ are bivalent organic groups containing from 1-3 atoms in the bivalent linkage and can be alkylene groups, oxalkylene, thialkylene and the like, including large groups in side chains on said linkage which can function as a ballast, e.g., groups containing at least 8 carbon atoms, provided said group preferably contains a carbon atom covalently bonded to E; Nu is an oxidizable nucleophilic group or a precursor for an oxidizable nucleophilic group including precursors such as hydrolyzable cyclic groups formed together with substituents on $R^1$, with useful oxidizable nucleophilic groups including, for example, a hydrazine group:

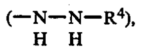

an hydroxyamino group:

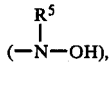

including an alkali-labile or hydrolyzable precursor for an hydroxyamino group such as:

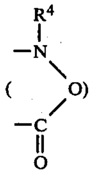

or

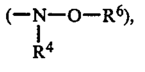

an hydroxy group (—OH) including precursors for an hydroxy group such as (—O—$R^6$), a sulfonamido group, a primary amino group (—$NH_2$) including precursors for a primary amino group, such as:

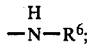

wherein $R^1$ is preferably an aromatic carbocyclic ring containing at least one amino or hydroxy group in an ortho or para position to Nu and m is 1 when Nu is an hydroxy group or a primary amino group; $R^6$ can be an alkali-labile group or hydrolyzable group such as an acyl group comprising from 2-10 carbon atoms; $R^4$ is an alkyl group having from 1-10 carbon atoms including substituted alkyl groups, an aryl group having from 6-20 carbon atoms including substituted aryl groups or a group mentioned for $R^6$; and $R^5$ can be a hydrogen atom or any group useful for $R^4$; E is an electrophilic group and is preferably a carbonyl group, including carbonyl (—CO—) and thiocarbonyl (—CS—), or it can be a sulfonyl group (—$SO_2$—); Q is a bivalent group providing a mono atom linkage between E and $X_2$ wherein said mono atom is a nonmetallic atom of group VA or VIA of the periodic table in its -2 or -3 valence state, such as a nitrogen atom, an oxygen atom, a sulfur atom, a selenium atom and the like, wherein said atom provides the two covalent bonds linking $X_2$ to E, and when it is a trivalent atom it can be monosubstituted with a hydrogen atom, an alkyl group containing from 1-20 atoms and preferably 1-10 carbon atoms, including substituted carbon atoms and carbocyclic groups, or an aryl group containing from 6-20 carbon atoms including substituted aryl groups; one of $X_1$ or Q—$X_2$ is a ballasting group of sufficient size to render said compound immobile in an alkali-permeable layer of a photographic element, and one of $X_1$ and Q—$X_2$ is a photographically useful moiety such as an image dye, an image-dye precursor, or a photographic reagent such as an antifoggant moiety, a toner moiety, a fixing agent, a development accelerator, a developing-agent moiety, a hardener moiety, and the like, including the necessary linking groups to attach the respective moiety to E or $R^1$; n and m are positive integers of 1 or 2; and $R^1$, $R^2$ and $R^3$ are selected to provide substantial proximity of Nu to E to permit intramolecular nucleophilic cleavage of Q from E and are preferably selected to provide 1 or 3 to 5 atoms between the atom which is the nucleophilic center of said nucleophilic group and the atom which is the electrophilic center, whereby said compound is capable of forming a 3- or 5- to 7-membered ring and most preferably a 5- or 6-membered ring upon intramolecular nucleophilic displacement of the group —Q—$X_2$ from said electrophilic group.

In the above formula where Q—$X_2$ is the photographically useful moiety, a photographically active group can be made available by Q upon cleavage of Q—X from the remainder of the compound, i.e., such as where Q—X forms a mercaptotetrazole and the like. However, where $X_1$ is the photographically useful group, the group should be attached in a manner so that it does not rely upon the cleavage to provide a photographically useful species.

The nature of the ballasting groups in the above compounds is not critical as long as the portion of the compound on the ballast side of E is primarily responsible for the immobility; the other portion of the molecule on the remaining side of E generally contains sufficient solubilizing groups to render it mobile and diffusible in an alkaline medium after cleavage. Thus, $X_1$ could be a hydrogen atom if $R^1$, $R^2$ and $R^3$ confer sufficient insolubility to the compound to render it immobile, especially where $R^2$ and $R^3$ include large side chains containing from about 8–20 carbon atoms. However, when $X_1$ or $X_2$ serve as the ballast function, they generally comprise long-chain alkyl radicals, as well as aromatic radicals of the benzene and naphthalene series. Typical, useful groups for the ballast function contain at least 8 carbon atoms and preferably at least 14 carbon atoms.

The term "nucleophilic group" as used herein refers to an atom or group of atoms which have an electron pair capable of forming a covalent bond. Groups of this type are sometimes ionizable groups which react as anionic groups. The term "oxidizable nucleophilic group" refers to that nucleophilic group which can be oxidized, thus causing a substantial reduction in the rate of intramolecular nucleophilic displacement relative to the electrophilic group. Generally, the groups are less nucleophilic in character upon oxidation or have a structure which adversely affects the proximity of the nucleophilic center with respect to the electrophilic center.

The nucleophilic group can contain only one nucleophilic center such as the oxygen atom in an hydroxy group, or it can contain more than one nucleophilic center such as in the case of an hydroxylamine group where either the nitrogen atom or the oxygen atom can be the nucleophilic center. Where more than one nucleophilic center is present in the nucleophilic group on the intramolecular nucleophilic displacement compounds of this invention, the nucleophilic attack and displacement will generally occur through the center which is capable of forming the most favored ring structure; i.e., if the oxygen atom of the hydroxylamine group would form a 7-membered ring and the nitrogen atom would form a 6-membered ring, the active nucleophilic center would generally be the nitrogen atom.

The term "electrophilic group" refers to an atom or group of atoms which are capable of accepting an electron pair to form a covalent bond. Typical electrophilic groups are sulfonyl groups ($—SO_2—$), carbonyl groups such as carbonyl (—CO—) and thiocarbonyl (—CS—), and the like, where the carbon atom of the carbonyl group forms the electrophilic center of the group and can sustain a partial positive charge. The term "electrophilic cleavage group" is used herein to refer to a group (—E—Q—) wherein E is an electrophilic group and Q is a bivalent leaving group providing a mono atom linkage between E and $X_2$ wherein said mono atom is a nonmetallic atom which has a negative valence of 2 or 3. The leaving group is capable of accepting a pair of electrons upon being released from the electrophilic group. Where the nonmetallic atom is a trivalent atom, it can be monosubstituted by a group which can be a hydrogen atom, an alkyl group including substituted alkyl groups and cycloalkyl groups, or an aryl group including substituted aryl groups. Typical atoms useful in Q are the nonmetallic atoms in groups VA and VIA of the periodic table which are capable of having a negative valence of 2 or 3, such as nitrogen atoms, sulfur atoms, oxygen atoms, selenium atoms and the like.

The intramolecular nucleophilic displacement compounds of this invention can contain electron-withdrawing or electron-donating substituents to alter the rate of reaction of the compound. In one highly preferred embodiment, electron-withdrawing groups are located on the cyclic group represented by $R^1$ to improve the reaction rates when the compound is used to release dye in an image-transfer film unit. In one preferred embodiment, $X_1$ is attached to $R^1$ through an electron-withdrawing group such as a sulfo group including a sulfonamide, a sulfone, and the like.

The term "nondiffusing" used herein has the meaning commonly applied to the term in photography and denotes materials which for all practical purposes do not migrate nor wander through organic colloid layers in an alkaline medium, such as gelatin, in the photographic elements of the invention. The same meaning is to be attached to the term "immobile".

The term "diffusible" as applied to the materials of this invention has the converse meaning and denotes materials having the property of diffusing effectively through the colloid layers of the photographic elements in an alkaline medium in the presence of "nondiffusing" materials. "Mobile" has the same meaning.

In one highly preferred embodiment, the immobile compounds of this invention comprise a 2,1-benzisoxazolone compound linked to a photographically useful moiety such as a dye or dye precursor. The dye can be connected to the benzisoxazolone moiety through an electrophilic cleavage group or it can be attached directly to the benzisoxazolone moiety with the provision that a ballast group is attached to the benzisoxazolone moiety through the electrophilic cleavage group. Certain preferred compounds can be represented by the formula:

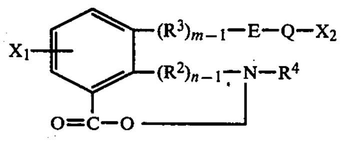

wherein $X_1$, $X_2$, E, Q, $R^2$, $R^3$, $R^4$, n and m are as defined above, and wherein $R^2$ and $R^3$ are additionally characterized as being bivalent groups containing from 1–2 atoms in the bivalent linkage and wherein n and m are preferably 1, $Q—X_2$ is preferably a dye or dye precursor including the necessary linking groups for synthesis to attach the dye or dye precursor to E or the benzene ring of said formula; E is preferably a carbonyl group; and Q comprises a bivalent group containing a nitrogen atom linking E to $X_2$. The benzene ring can, of course, contain additional substituents such as electron-withdrawing groups or electron-donating groups to provide changes in the resonance of the compound, thus providing for variations in reaction rates.

Typical useful benzisoxazolone compounds are as follows:

-continued
Compound I
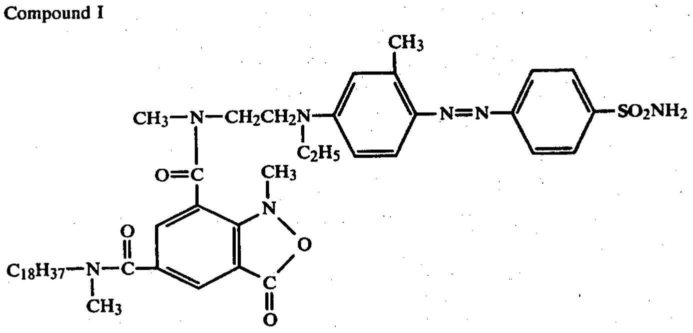
Compound II
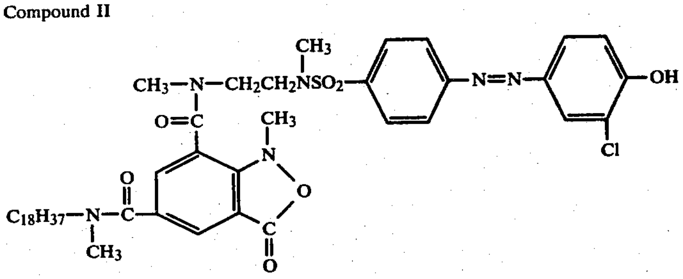
Compound III
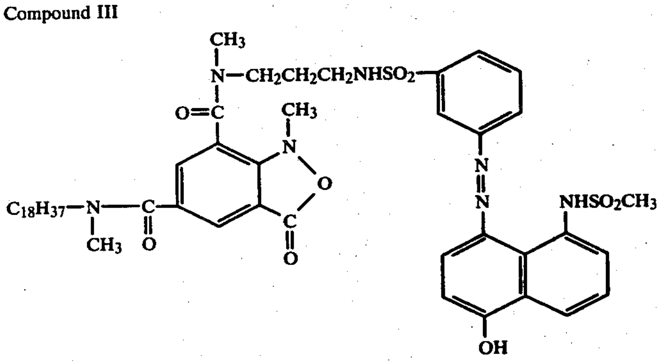
Compound IV
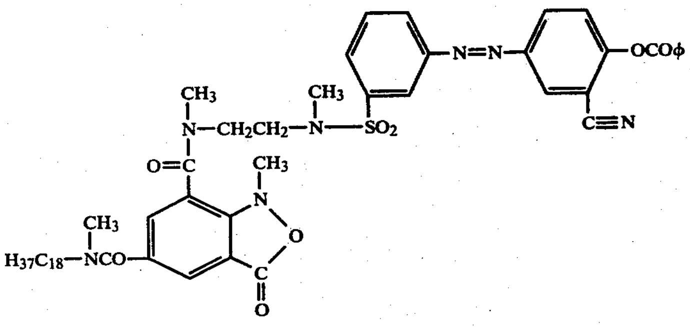
Compound V
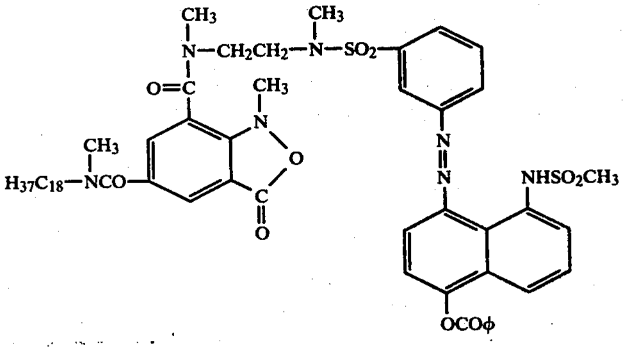

-continued
Compound VI
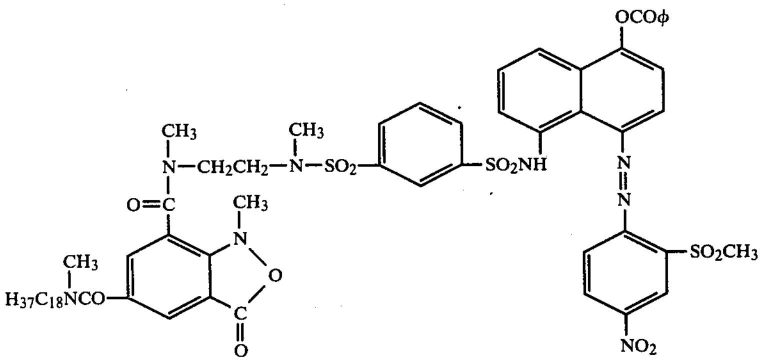
Compound VII
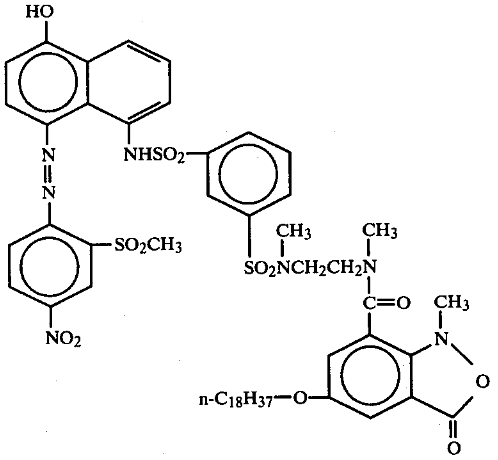
Compound VIII
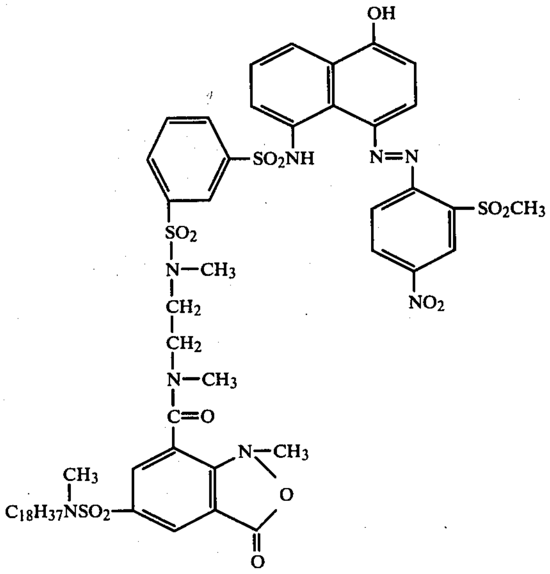

-continued
Compound IX
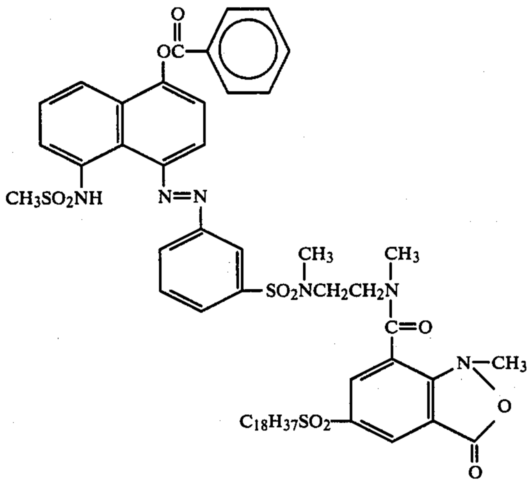
Compound X
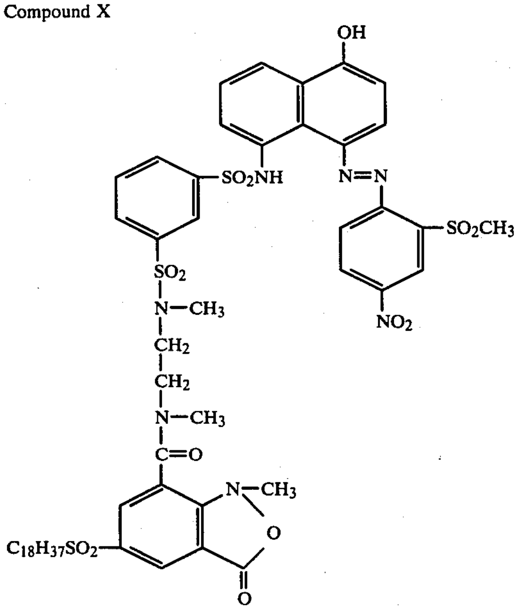
Compound XI
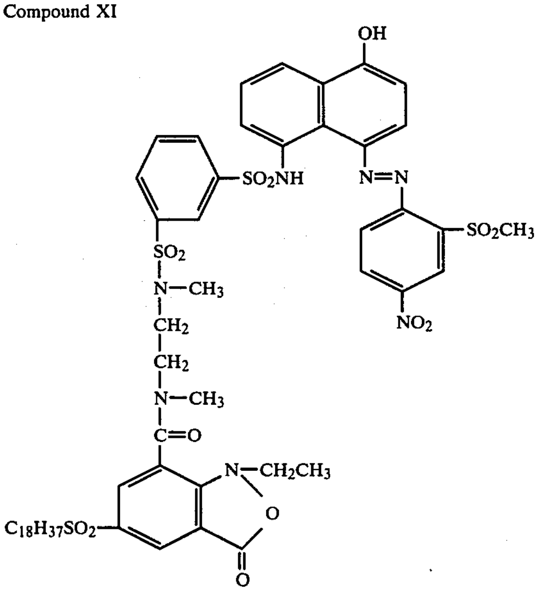

In another embodiment, useful positive-working intramolecular nucleophilic displacement compounds include compounds containing an aromatic ring having an oxidizable nucleophilic group substituent on a carbon atom of said ring and ortho thereto a substituent containing a carbamic ester derivative located to facilitate intramolecular nucleophilic displacement with said nucleophilic group, and wherein said compound contains a ballast moiety linked to a photographically useful group through said carbamic acid derivative. Compounds of this type are disclosed in U.S. Pat. No. 3,980,479 by Fields et al issued Sept. 14, 1976, and entitled "Positive-Working Immobile Photographic Compounds Which Cleave by Intramolecular Nucleophilic Displacement in Alkali Unless Oxidized", which is incorporated herein by reference.

The photographic processes using the immobile compounds are generally carried out in an alkaline medium wherein the nucleophilic displacement can easily take place. In certain embodiments, the processes are carried out in an alkaline medium having a pH of above 12; at a high pH silver halide development proceeds rapidly, dye mobility is generally high, and the like. High-pH conditions are especially preferred for image-transfer processes using the compounds of this invention. Moreover, when the 2,1-benzisoxazolone compounds as described above are used in photographic elements, they are generally contacted with an alkaline solution at a pH sufficiently high to hydrolyze the isoxazolone ring to form an hydroxylamino group. The compound can then react with an oxidized silver halide developer to reduce the rate of release of the photographically useful group; however, where the compound remains unoxidized, the photographically useful group is released.

The compounds of this invention can generally be prepared by using conventional techniques used in organic chemistry with proper selection of the starting materials. The photographically useful group can be synthesized by methods known in the art with the appropriate linkages and groups for reaction with the remainder of the compound. The examples define a typical preferred procedure where the acid chloride of a 2,1-benzisoxazolone-3-one is reacted with a dye with an amine group thereon by a Schotten-Baumann reaction to produce compounds in accordance with this invention.

The 1,2benzisoxazolone intermediate can be made by several procedures. In one exemplary procedure, o-nitrobenzoic acid derivatives can be reduced electrochemically in acidic media to the corresponding hydroxylamino compounds with concomitant acid-catalyzed ring-closure reaction. The electrochemical reduction can be carried out using a mercury working electrode when working on small scales, and preferably when working at large scales a cathode having a low hydrogen overvoltage is preferred such as platinum, graphite, stainless steel, nickel, copper, chromium, silver and the like. In another exemplary procedure, the o-nitrobenzoic acids are reduced by a catalytic hydrogenation process using a platinum dioxide or rhodium catalyst. In a preferred exemplary procedure, the o-nitrobenzoic acids are reduced by chemical reducing agents such as zinc, tin, stannous chloride, etc., under appropriate conditions.

In certain preferred embodiments, the compounds of this invention comprise a moiety which is an image dye-providing material. Preferably, the image dye-providing moiety is a preformed dye or a shifted dye. Dye materials of this type are well-known in the art and include dyes such as azo dyes, azomethine (imine) dyes, anthraquinone dyes, alizarin dyes, merocyanine dyes, quinoline dyes, cyanine dyes and the like. The shifted dyes include those compounds wherein the light absorption characteristics are shifted hypsochromically or bathochromically when subjected to a different environment such as a change in pH, reaction with a material to form a complex, tautomerization, reactions to change the pKa of the compound, removal of a group such as a hydrolyzable acyl group connected to an atom of the chromophore as mentioned in Weyerts, U.S. Pat. No. 3,260,597 issued July 12, 1966, and the like. In certain embodiments, the shifted dyes are highly preferred and especially those containing a hydrolyzable group on an atom affecting the chromophore resonance structure, since the compounds can be incorporated directly in a silver halide emulsion layer or even on the exposure side thereof without substantial reduction in the recording light exposure. After exposure, the dye can be shifted to the appropriate color such as, for example, by hydrolytic removal of the acyl group to provide the respective image dye.

In another embodiment, the compounds of this invention contain a moiety which is an image-dye precursor. The term "image-dye precursor" is understood to refer to those compounds which undergo reactions encountered in a photographic imaging system to produce an image dye, such as color couplers, oxichromic compounds, and the like.

The compounds described herein have particular application in a diffusion transfer process where it is desired to have a dye entity transferred to an adjacent layer or a receiving element. However, in certain embodiments this invention relates to the release of an imagewise distribution of a diffusible photographically useful compound which is a photographic reagent Typical useful photographic reagents are known in the art, such as in U.S. Pat. Nos. 3,227,551, 3,698,898, 3,379,529 and 3,364,022, for example, a silver complexing agent, a silver halide solvent, a fixing agent, a toner, a hardener, an antifoggant, a fogging agent, a sensitizer, a desensitizer, a developer or an oxidizing agent. In other words, $X_1$ and —Q—$X_2$ in the above formula may represent any moiety which, in combination with a hydrogen atom, provides a photographic reagent upon cleavage.

A typical useful compound containing a photographic reagent is as follows:

-continued

Compound XII

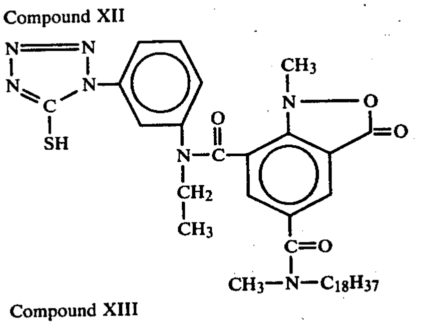

Compound XIII

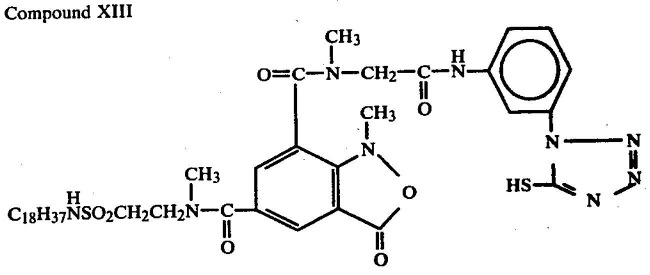

The photographically useful moiety represented by Q—$X_2$ or $X_1$ in the above formula can be a silver halide development inhibitor including triazoles and tetrazoles such as a 5-mercapto-1-phenyltetrazole, a 5-methylbenzotriazole, a 4,5-dichlorobenzotriazole and the like, and it can also be an antifoggant including azaindenes such as a tetrazaindene and the like. The compounds which contain releasable silver halide development inhibitors or antifoggants can generally be used in the photographic elements in association with silver halide layers wherein said compound can be incorporated in amounts such as 1 to 100 mg./ft.$^2$ dissolved in a coupler solvent such as diethyl lauramide. When these compounds are incorporated in photographic elements in association with negative silver halide emulsions, a positive imagewise distribution of inhibitor or antifoggant will be produced upon development. Thus, silver development is inhibited or restrained in the low-exposure toe as seen on the H and D curve, but not in the more fully exposed shoulder as seen on the H and D curve. Development inhibition of the unexposed areas is thereby achieved selectively. When the silver halide emulsions also have dye releasers in accordance with this invention associated therewith, the overall effect of the inhibitor or antifoggant is to release more dye in the unexposed regions, improving maximum image dye density to the image-receiving layer without increasing the amount of dye released in the exposed regions.

The photographically useful moiety represented by Q—$X_2$ or $X_1$ can also be a silver halide development accelerator such as a benzyl alcohol, a benzylpicolinium bromide and the like, a foggant including hydrazines and hydrazides such as an acetylphenylhydrazine and the like, or an auxiliary developer such as a hydroquinone, a 1-phenyl-3-pyrazolidone, an ascorbic acid and the like. When these compounds are used in photographic elements in association with silver halide emulsions which also have associated therewith image dye-providing materials in accordance with this invention, the released dye density of all dyes in the unexposed regions would be somewhat reduced by fog development. If, however, one layer was unexposed while the other two were given an imagewise exposure, the amount of foggant or development accelerator reaching the unexposed layer from the other two layers would be less where those layers were exposed. Hence, the Dmax of the unexposed layer would increase as a function of exposure of the other two layers. This greatly enhances the saturation of single colors in a photograph.

When color couplers are present in the compounds of this invention, the coupler can be released in areas where no development occurs and can diffuse to an adjacent layer where they can be reacted with an oxidized color developer such as a primary aromatic amine to form the image dye. Generally, the color coupler and the color developer are so chosen that the reaction product is immobile. Typical useful color couplers include the pyrazolone couplers, pyrazolotriazole couplers, open-chain ketomethylene couplers, phenolic couplers and the like. Further reference to the description of appropriate couplers is found in Marchant, U.S. Pat. No. 3,620,747 issued Nov. 16, 1971, which is incorporated herein by reference.

The compounds of this invention containing oxichromic moieties can also be advantageously used in a photographic system since they are generally colorless materials due to the absence of an image-dye chromophore. Thus, they can also be used directly in the photographic emulsion or on the exposure side thereof without competitive absorption. Compounds of this type are those compounds which undergo chromogenic oxidation to form the respective image dye. The oxidation can be carried out by aerial oxidation, incorporation of oxidants into the photographic element or film unit, or use of an oxidant during processing. Compounds of this type have been referred to in the art as leuco compounds, i.e., compounds which have no color. Typical useful oxichromic compounds include leuco indoanilines, leuco indophenols, leuco anthraquinones and the like. In certain preferred embodiments, the compounds of this invention contain oxichromic moieties as described in Lestina and Bush, U.S. Ser. No. 308,869 filed Nov. 22, 1972, now U.S. Pat. No. 3,880,658 issued Apr. 29, 1975 which is incorporated herein by reference.

The compounds of this invention are particularly useful in photographic elements and in photographic processes to provide an imagewise distribution of a photographically useful compound. The photographic element can contain the immobile compounds in association with any photographic material which produces an oxidation product during development which in turn can react with the nucleophilic group on said compound. In certain preferred embodiments, where silver halide emulsions are used as the recording means, the emulsion can be a negative, direct-positive or reversal emulsion and the like which undergo development with a silver halide developing agent to produce oxidized silver halide developer. The oxidized silver halide developing agent can react with the nucleophilic group to produce an addition product and the like, but preferably the silver halide developing agent is so chosen that a simple redox reaction takes place to reduce substantially the rate of release of the photographically useful moiety.

Black-and-white or one-color systems can be made which employ as few as one silver halide emulsion and compounds according to this invention which comprise the required image dye-providing moieties to provide the desired net color effect. Preferably, the compounds of this invention are used in three-color systems such as, for example, photographic elements containing a layer comprising a red-sensitive silver halide emulsion having associated therewith an intramolecular nucleophilic displacement compound comprising a cyan image dye-providing moiety, a layer containing a green-sensitive silver halide emulsion having associated therewith an intramolecular nucleophilic displacement compound which comprises a magenta image dye-providing moiety, and a layer containing a blue-sensitive silver halide emulsion having associated therewith an intramolecular nucleophilic displacement compound which comprises a yellow image dye-providing moiety.

The photographic element can be designed to provide an image record in either the image dye-providing material released and made diffusible or in the immobile dye remaining in the initial location attached to the oxidized compound and associated with the respective photographic recording material or, in certain instances, both image records can be used. The residual nondiffusible dye can provide an image record which will be present as a function of silver halide development. The silver and silver halide remaining after development can be removed, if desired, to provide better color properties in the record.

In certain preferred embodiments, the photograhic element is used in an image-transfer film unit where the dye image-providing material upon release diffuses to an adjacent image-receiving layer. The compounds of this invention can be used in any image-transfer unit format where either initially mobile compounds are used, such as dye developers, or where the initially immobile compounds are used, such as ballasted redox releasing compounds. Typical useful image-transfer formats are disclosed in U.S. Pat. Nos. 2,543,181, 2,661,293, 2,774,668, 2,983,606, 3,227,550, 3,227,552, 3,309,201, 3,415,644, 3,415,645, 3,415,646 and 3,635,707, Canadian Pat. No. 674,082, Belgian Pat. Nos. 757,959 and 757,960, both issued Apr. 23, 1971, and the like. However, the appropriate silver halide emulsions will have to be used in each format since the present compounds yield a positive image in diffusible dye with a negative recording and developing emulsion.

In certain embodiments, the photographic elements of this invention are processed in the presence of a silver halide developing agent which is preferably a silver halide developing agent which has a redox potential whereby it will cross-oxidize when oxidized with immobile compounds of this invention. Typical useful silver halide developers include hydroquinone compounds such as hydroquinone, 2,5-dichlorohydroquinone, 2-chlorohydroquinone and the like; aminophenol compounds such as 4-aminophenol, N-methylaminophenol, 3-methyl-4-aminophenol, 3,5-dibromoaminophenol and the like; catechol compounds such as catechol, 4-cyclohexylcatechol, 3-methoxycatechol, 4-(N-octadecylamino)catechol and the like; phenylenediamine compounds such as N,N-diethyl-p-phenylenediamine, 3-methyl-N,N-diethyl-p-phenylenediamine, 3-methoxy-N-ethyl-N-ethoxy-p-phenylenediamine, N,N,N',N'-tetramethyl-p-phenylenediamine and the like; 3-pyrazolidone compounds such as 1-phenyl-3-pyrazolidone, 1-phenyl-4,4-dimethyl-3-pyrazolidone, 4-hydroxymethyl-4-methyl-1-phenyl-3-pyrazolidone, 1-m-tolyl-3-pyrazolidone, 1-p-tolyl-3-pyrazolidone, 1-phenyl-4-methyl-3-pyrazolidone, 1-phenyl-5-methyl-3-pyrazolidone, 1-phenyl-4,4-bis-(hydroxymethyl)-3-pyrazolidone, 1,4-dimethyl-3-pyrazolidone, 4-methyl-3-pyrazolidone, 4,4-dimethyl-3-pyrazolidone, 1-(3-chlorophenyl)-4-methyl-3-pyrazolidone, 1-(4-chlorophenyl)-4-methyl-3-pyrazolidone, 1-(3-chlorophenyl)-3-pyrazolidone, 1-(4-chlorophenyl)-3-pyrazolidone, 1-(4-tolyl)-4-methyl-3-pyrazolidone, 1-(2-tolyl)-4-methyl-3-pyrazolidone, 1-(4-tolyl)-3-pyrazolidone, 1-(3-tolyl)-3-pyrazolidone, 1-(3-tolyl)-4,4-dimethyl-3-pyrazolidone, 1-(2-trifluoroethyl)-4,4-dimethyl-3-pyrazolidone, 5-methyl-3-pyrazolidone and the like; etc. A plurality of developing agents such as those disclosed in U.S. Pat. No. 3,039,869 can also be employed. Such developing agents can be employed in the liquid processing composition or may be contained, at least in part, in any layer or layers of the photographic element or film unit such as the silver halide emulsion layers, the dye image-providing material layers, interlayers, image-receiving layer, etc.

In highly preferred embodiments of this invention, the photographic element or film unit contains a compound in addition to said immobile compounds, which is an antifoggant or development restrainer which substantially prevents any further development of a silver halide emulsion after the initial imagewise development has occurred. Generally, the compound is one which will at least prevent fog buildup in a silver halide layer during the time necessary to release a substantial amount of the photographically useful group from the unoxidized compound. Typical useful development restrainer precursors which can be used to permit initial development but restrain development thereafter are disclosed in U.S. Pat. No. 3,260,597 by Weyerts, U.S. Pat. No. 4,009,029 by Hammond et al issued Feb. 22, 1977, and the like. Conventional development restrainers can also be used in the photographic elements or film units wherein they are located in the processing composition, in layers adjacent the silver halide emulsion layers, in the receiving element, in a cover sheet, etc., where contact with the silver halide emulsion is delayed until after the initial image-recording development has occurred.

In a photographic element according to the invention, each silver halide emulsion layer containing an image dye-providing material or having the image dye-providing material present in a contiguous layer may be separated from the other silver halide emulsion layers in the negative portion of the film unit by materials in addition to those described above, including gelatin, calcium alginate, or any of those disclosed in U.S. Pat.

No. 3,384,483, polymeric materials such as polyvinylamides as disclosed in U.S. Pat. No. 3,421,892, or any of those disclosed in French Pat. No. 2,028,236 or U.S. Pat. Nos. 2,992,104, 3,043,692, 3,044,873, 3,061,428, 3,069,263, 3,069,264, 3,121,011 and 3,427,158.

In certain preferred embodiments, the multicolor photographic elements of this invention contain interlayers containing antistain agents or oxidized developer scavengers, which interlayers are located between the respective color image-recording layers. Typical antistain agents or oxidized developer scavengers which aid in obtaining improved color separation are disclosed in U.S. Pat. Nos. 2,701,187, 3,700,453, 2,728,659, etc.

Generally speaking, except where noted otherwise, the silver halide emulsion layers in the invention comprise photosensitive silver halide dispersed in gelatin and are about 0.6 to 6 microns in thickness; the image dye-providing materials are dispersed in an aqueous alkaline solution-permeable polymeric binder, such as gelatin, in the same layer as the silver halide emulsion or as a separate layer about 1 to 7 microns in thickness; and the alkaline solution-permeable polymeric interlayers, e.g., gelatin, are about 1 to 5 microns in thickness. Of course, these thicknesses are approximate only and can be modified according to the product desired. In addition to gelatin, other suitable hydrophilic materials include both naturally occurring substances such as proteins, cellulose derivatives, polysaccharides such as dextran, gum arabic and the like; and synthetic polymeric substances such as water-soluble polyvinyl compounds like poly(vinylpyrrolidone), acrylamide polymers and the like.

The photographic emulsion layers and other layers of a photographic element employed in the practice of this invention can also contain, alone or in combination with hydrophilic, water-permeable colloids, other synthetic polymeric compounds such as dispersed vinyl compounds such as in latex form, and particularly those which increase the dimensional stability of the photographic materials. Suitable synthetic polymers include those described for example, in U.S. Pat. Nos. 3,142,568 by Nottorf issued July 28, 1964, 3,193,386 by White issued July 6, 1965, 3,062,674 by Houck et al issued Nov. 6, 1962, 3,220,844 by Houck et al issued Nov. 30, 1965, 3,287,289 by Ream et al issued Nov. 22, 1966, and 3,411,911 by Dykstra issued Nov. 19, 1968. Particularly effective are water-insoluble polymers of alkyl acrylates and methacrylates, acrylic acid, sulfoalkyl acrylates or methacrylates, those which have cross-linking sites which facilitate hardening or curing, and those having recurring sulfobetaine units as described in Dykstra, Canadian Pat. No. 774,054.

Any material can be employed as the image-receiving layer in the film units of this invention as long as the desired function of mordanting or otherwise fixing the image dyes will be obtained. The particular material chosen will, of course, depend upon the dye image to be mordanted as mentioned hereinbefore.

Use of a pH-lowering layer in the film units of the invention will usually increase the stability of the transferred image. Generally, the pH-lowering layer will effect a reduction in the pH of the image layer from about 13 or 14 to at least 11 and preferably 5–8 within a short time after imbibition. For example, polymeric acids as disclosed in U.S. Pat. Nos. 3,362,819 issued Jan. 9, 1968, 2,584,030 issued Jan. 29, 1952, or 2,548,575 issued Apr. 10, 1951, or Belgian Pat. No. 603,747 issued May 31, 1961, p. 47, may be employed. Such polymeric acids reduce the pH of the film unit after development to terminate development and substantially reduce further dye transfer and thus stabilize the dye image. Such polymeric acids comprise polymers containing acid groups, such as carboxylic acid and sulfonic acid groups, which are capable of forming salts with alkali metals, such as sodium or potassium, or with organic bases, particularly quaternary ammonium bases, such as tetramethyl ammonium hydroxide. The polymers can also contain potentially acid-yielding groups such as anhydrides or lactones or other groups which are capable of reacting with bases to capture and retain them. Generally, the most useful polymeric acids contain free carboxyl groups, being insoluble in water in the free acid form and which form water-soluble sodium and/or potassium salts. Examples of such polymeric acids include dibasic acid half-ester derivatives of cellulose, which derivatives contain free carboxyl groups, e.g., cellulose acetate hydrogen phthalate, cellulose acetate hydrogen gluturate, cellulose acetate hydrogen succinate, ethyl cellulose hydrogen succinate, ethyl cellulose acetate hydrogen succinate, cellulose acetate succinate hydrogen phthalate; ether and ester derivatives of cellulose modified with sulfoanhydrides, e.g., with ortho-sulfobenzoic anhydride; polystyrene sulfonic acid; carboxymethyl cellulose; polyvinyl hydrogen phthalate; polyvinyl acetate hydrogen phthalate; polyacrylic acid, acetals of polyvinyl alcohol with carboxy or sulfo-substituted aldehydes, e.g., o-, m- or p-benzaldehyde sulfonic acid or carboxylic acid; partial esters of ethylene/-maleic anhydride copolymers; partial esters of methylvinyl ether/maleic anhydride copolymers; etc. In addition, solid monomeric acid materials could also be used such as palmitic acid, oxalic acid, sebacic acid, hydrocinnamic acid, metanilic acid, paratoluenesulfonic acid and benzenedisulfonic acid. Other suitable materials are disclosed in U.S. Pat. Nos. 3,422,075 and 2,635,048.

The pH-lowering layer is usually about 0.3 to about 1.5 mils in thickness and can be located in the receiver portion of the film unit between the support and the image-receiving layer, on the cover sheet, or anywhere within the film unit as long as the desired function is obtained.

An inert timing or spacer layer coated over the pH-lowering layer may also be used to "time" or control the pH reduction of the film unit as a function of the rate at which the alkali diffuses through the inert spacer layer. Timing layers can also be used effectively to isolate development restrainers in a layer adjacent the image-receiving layer wherein restrainers will be released after alkali breakdown of the timing layer. Examples of such timing layers include gelatin, polyvinyl alcohol or any of those disclosed in U.S. Pat. No. 3,455,686. The timing layer is also effective in evening out the various reaction rates over a wide range of temperatures, e.g., premature pH reduction is prevented when imbibition is effected at temperatures above room temperature, for example, at 95° to 100° F. The timing layer is usually about 0.1 to about 0.7 mil in thickness. Especially good results are obtained when the timing layer comprises a hydrolyzable polymer or a mixture of such polymers which are slowly hydrolyzed by the processing composition. Examples of such hydrolyzable polymers include polyvinyl acetate, polyamides, cellulose esters, etc.

The alkaline processing composition employed in this invention can be conventional aqueous solutions of an alkaline material, e.g., sodium hydroxide, sodium carbonate or an amine such as diethylamine, preferably possessing a pH in excess of 12, and preferably contains a developing agent as described previously. The solution also preferably contains a viscosity-increasing compound such as a high-molecular-weight polymer, e.g., a water-soluble ether inert to alkaline solutions such as hydroxyethyl cellulose or alkali metal salts of carboxymethyl cellulose such as sodium carboxymethyl cellulose. A concentration of viscosity-increasing compound of about 1 to about 5% by weight of the processing solution is preferred which will impart thereto a viscosity of about 100 cps. to about 200,000 cps.

The alkaline processing composition employed in this invention can also contain a desensitizing agent such as methylene blue, nitro-substituted heterocyclic compounds, 4,4′-bipyridinium salts, etc., to insure that the photosensitive element is not further exposed after it is removed from the camera for processing.

While the alkaline processing composition used in this invention can be employed in a rupturable container, as described previously, to facilitate conveniently the introduction of processing composition into the film unit, other means of discharging processing composition within the film unit could also be employed, e.g., interjecting processing solution with communicating members similar to hypodermic syringes which are attached either to a camera or camera cartridge, as described in Harvey, U.S. Pat. No. 3,352,674 issued Nov. 14, 1967.

In certain embodiments of our invention, and especially with integral format film units, an opacifying agent can be employed in the processing composition in our invention. Examples of opacifying agents include carbon black, barium sulfate, zinc oxide, barium stearate, silver flake, silicates, alumina, zirconium oxide, zirconium acetyl acetate, sodium zirconium sulfate, kaolin, mica, titanium dioxide, organic dyes such as the nigrosines, or mixtures thereof in widely varying amounts depending upon the degree of opacity desired. In general, the concentration of opacifying agent should be sufficient to prevent further exposure of the film unit's silver halide emulsion or emulsions by ambient actinic radiation through the layer of processing composition, either by direct exposure through a support or by light piping from the edge of the element. For example, carbon black or titanium dioxide will generally provide sufficient opacity when they are present in the processing solution in an amount of from about 5 to 40% by weight. After the processing solution and opacifying agent have been distributed into the film unit, processing may take place out of the camera in the presence of actinic radiation in view of the fact that the silver halide emulsion or emulsions of the laminate are appropriately protected by incident radiation, at one major surface by the opaque processing composition and at the remaining major surface by an alkaline solution-permeable opaque layer. Opaque binding tapes can also be used to prevent edge leakage of actinic radiation incident on the silver halide emulsion. In certain embodiments, ballasted indicator dyes or dye precursors can be incorporated in a layer on the exposure side of the photosensitive layers; the indicator dye is preferably transparent during exposure and becomes opaque when contacted with the processing composition.

When titanium dioxide or other white pigments are employed as the opacifying agent in the processing composition in our invention, it may also be desirable to employ in cooperative relationship therewith a pH-sensitive opacifying dye such as a phthalein dye. Such dyes are light-absorbing or colored at the pH at which image formation is effected and colorless or not light-absorbing at a lower pH.

The alkaline solution-permeable, substantially opaque, light-reflective layer in the integral negative receiver film units of our invention can generally comprise any opacifier dispersed in a binder as long as it has the desired properties. Particularly desirable are white light-reflective layers since they would be esthetically pleasing backgrounds on which to view a transferred dye image and would also possess the optical properties desired for reflection of incident radiation. Suitable opacifying agents include titanium dioxide, barium sulfate, zinc oxide, barium stearate, silver flake, silicates, alumina, zirconium oxide, zirconium acetyl acetate, sodium zirconium sulfate, kaolin, mica, or mixtures thereof in widely varying amounts depending upon the degree of opacify desired. The opacifying agents may be dispersed in any binder such as an alkaline solution-permeable polymeric matrix such as, for example, gelatin, polyvinyl alcohol, and the like. Such an opaque layer would generally have a density of at least 4 and preferably greater than 7 and would be substantially opaque to actinic radiation. The opaque layer may also be combined with a developer scavenger layer if one is present. The light-reflective and opaque layer are generally 1 to 6 mils in thickness, although they can be varied depending upon the opacifying agent employed, the degree of opacity desired, etc.

The supports of the film elements of this invention can be any material as long as it does not deleteriously affect the photographic properties of layers thereon and is substantially dimensionally stable. Typical useful supports, include cellulose nitrate film, cellulose acetate film, poly(vinyl acetal) film, polystyrene film, poly(ethyleneterephthalate) film, polycarbonate film, poly-α-olefins such as polyethylene and polypropylene film, and related films or resinous materials, as well as glass. In those embodiments where the support is transparent, it is usually about 2 to 6 mils in thickness and may contain an ultraviolet absorber if desired.

The support of the integral negative receiver film assemblies and the cover sheet used with these assemblies of this invention can be any of the materials mentioned above for the support. If desired, an ultraviolet-absorbing material and a material for preventing light piping can be employed in the support or cover sheet.

The photosensitive substances used in this invention are preferably silver halide compositions and can comprise silver chloride, silver bromide, silver bromiodide, silver chlorobromoiodide and the like, or mixtures thereof. The emulsions may be coarse- or fine-grain and can be prepared by any of the well-known procedures, e.g., single-jet emulsions, double-jet emulsions, such as Lippmann emulsions, ammoniacal emulsions, thiocyanate or thioether ripened emulsions such as those described in U.S. Pat. Nos. 2,222,264 by Nietz et al, 3,320,069 by Illingsworth, and 3,271,157 by McBride. Surface-image emulsions can be used or internal-image emulsions can be used such as those described in U.S. Pat. Nos. 2,592,250 by Davey et al, 3,206,313 by Porter et al, and 3,447,927 by Bacon et al. The emulsions may be regular-grain emulsions such as the type described in Klein and Moisar, J. Phot. Sci., Vol. 12, No. 5, Sept./Oct., 1964, pp. 242–251. The silver halide emulsions can be spectrally sensitized by means known in the art including techniques of spectrally sensitizing to provide good color balance under various light illumination as described in Schwan et al, U.S. Pat. No. 3,672,898 issued June 27, 1972. The silver halide emulsions can be made, if desired, using techniques to achieve high-camera-speed emulsions having ASA speeds of from 400 to above 1000. If desired, mixtures of surface- and internal-image emulsions can be used as described in Luckey et al, U.S. Pat. No. 2,996,382.

Negative-type emulsions can be used or direct-positive emulsions can be used such as those described in U.S. Pat. Nos. 2,184,013 by Leermakers, 2,541,472 by Kendall et al, 3,367,778 by Berriman, 3,501,307 by Illingsworth et al issued Mar. 17, 1970, 2,563,785 by Ives, 2,456,953 by Knott et al, 2,861,885 by Land, 3,761,276 by Evans, 3,761,266 by Milton, 3,761,267 by Gilman et al, 3,736,140 by Collier et al and 3,730,723 by Gilman et al, British Patent No. 723,019 by Schouwenaars, and U.S. Ser. No. 154,155 by Gilman et al filed June 17, 1971, ultimately issued as U.S. Pat. No. 4,011,081 dated Mar. 3, 1977.

In still another embodiment, the intramolecular nucleophilic displacement compounds can be coated in a layer in an alkali-permeable binder on a support to provide what is often referred to as a receiver element. The receiver element can be processed by several methods including positioning it in interfacial contact with a photographic silver halide element in the presence of an alkaline solution and a silver halide developer. In those areas where an oxidizing agent such as oxidized developer diffuses to the receiver layer, the nucleophilic displacement compound will be oxidized, and if it contains a dye moiety it will provide a permanent image dye record in the areas corresponding to the imagewise distribution of oxidizing agent. The remainder of the dye can be removed from the element, for example, by washing, after intramolecular nucleophilic displacement. With proper selection of the image dye-providing moieties, a black-and-white image can be obtained. Also, if the nucleophilic compound contains a tanning agent as the photographically useful moiety, it is possible to obtain a tanned image record in areas whre silver halide development does not take place, i.e., a positive image record if a negative emulsion is used.

In this application, certain groups are identified with reference to the periodic table. The reference table is located on pp. 400-1 of the *Handbook of Chemistry and Physics*, 39th Ed., Chemical Rubber Publishing Co.

The photographic elements, as described above, generally comprise at least one layer containing photographic recording material, such as silver halide, having associated therewith an immobile compound. The term "associated therewith" is a term of art in the photographic industry and generally refers to said immobile compound in alkaline-permeable relationship with said photographic recording material. The respective materials can be coated in the same layers or separate layers, as long as they are effectively associated and isolated to provide for the desired reactions before a substantial amount of the intermediate reactant products diffuse into adjacent photographic recording layers, etc.

The invention can be further illustrated by the following examples.

EXAMPLE 1-A

Preparation of 7-chloroformyl-1-methyl-2,1-benzisoxazolin-3-one-5-N-methyloctadecylcarboxamide (1A)

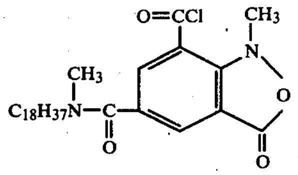

(a) 2-nitrotrimesic acid (1B)

To a solution of 40.0 g. (1 mole) of sodium hydroxide in 1000 ml. water are added 64 g. (0.33 mole) of a mixture of nitro-3,5dimethylbenzoic acids (Chem. Ber. 34, 27, 1901). The yellow solution is brought to boiling and 220 g. potassium permanganate are added in portions as fast as the purple color is discharged. After the permanganate addition, the reaction is refluxed an additional 30 min. and then cooled to room temperature. The manganese dioxide precipitate is removed by suction filtration through a celite pad. The deep green filtrate is made acidic with concentrated hydrochloric acid (200 ml.). The aqueous solution is then continuously extracted with ether overnight. Evaporation of the dried ether extracts gives 30 g. of pale yellow 2-nitrotrimesic acid, M.P. 290° C. dec.

(b) 5,7-dicarboxylic-2,1-benzisoxazolin-3-one (1C)

A solution of 2.0 g. of 1C in 5 ml. of 1:1 ethanol:water, 2 M in sulfuric acid, is electrolyzed at controlled potential (E ½ vs. SCE, -0.07 volt) using a mercury working electrode. After the electrolysis, the yellow solution is concentrated under reduced pressure until most of the ethanol has been removed. The precipitate which has formed is collected and washed with cold water. The yield of 1C is 1.0 g. The crude material which turns yellow on standing is used directly in the next step.

(c) 1-methyl-5,7-dicarboxy-2,1-benzisoxazolin-one (1D)

Crude 1C is dissolved in a slight excess of aqueous sodium carbonate solution and treated with a 10% excess of dimethylsulfate. The reaction is warmed on a steam bath under nitrogen with swirling until the solution becomes homogeneous. The warm reaction mixture is immediately made acidic with concentrated sulfuric acid and allowed to cool. The precipitate which forms on cooling is collected, dried and used directly in the next step. Mass spectrum, m/e 237 (m+).

(d) 7-carboxy-1-methyl-2,1-benzisoxazolin-3-one-5-N-methyloctadecylcarboxamide (1E)

The above product 1D is slurried in an excess of neat thionyl chloride and boiled under reflux for 2 hr. During this time all the solid goes into solution, giving a clear yellow reaction mixture. The excess thionyl chloride is removed under reduced pressure, leaving 5,7-bis(chloroformyl)-1-methyl-2,1-benzisoxazolin-3-one (1E) as a yellow oil which solidifies.

The bis-acid chloride (1E) is immediately dissolved in tetrahydrofuran and treated with 4 equivalents of N-methyloctadecylamine dissolved in tetrahydrofuran. The reaction is slurried under nitrogen at room temperature for 15 min. The precipitated N-methyloctadecylamine hydrochloride is removed by filtration and the tetrahydrofuran filtrate is concentrated under reduced pressure, giving the bis-amide 1-methyl-2,1-benzisoxazolin-3-one-5,7-bis(N-methyloctadecylcarboxamide) (1F) which is used directly.

A 10% solution of 1F in warm ethanol is treated with an equal volume of 20% aqueous potassium hydroxide solution under a good nitrogen atmosphere. The yellow reaction mixture is stirred under nitrogen for 15 min. and then made acidic with concentrated hydrochloric acid. The white precipitate is collected and washed well with water. The white solid is treated with tetrahydrofuran and the insoluble N-methyloctadecylamine hydrochloride is removed by filtration. The tetrahydrofuran filtrate is dried over anhydrous calcium sulfate and concentrated under reduced pressure. The solid residue is recrystallized from ethanol-petroleum ether to give the acid-amide 1G as a white solid, M.P. 135°-136° C.; mass spectrum, m/e 502 (m+).

(e)
7-chloroformyl-1-methyl-2,1-benzisoxazolin-3-one-5-N-methyloctadecylcarboxamide (1A)

A solution of acid-amide 1G in excess neat thionyl chloride is boiled under reflux for 2 hr. The excess thionyl chloride is removed under reduced pressure, leaving the desired acid chloride (1A) as a yellow solid.

EXAMPLE 1-B:

Preparation of Compound I

Step 1: A solution of 1.72 g. (0.01 mole) of p-aminobenzenesulfonamide in 10 ml. of 3 N aqueous HCl (0.03 mole) is cooled in an ice bath. A precipitate forms. A solution of 0.7 g. (0.01 mole +) of sodium nitrite in 5 ml. of water previously cooled in ice is then added slowly with stirring. All of the precipitate dissolves to a very pale yellow solution. The mixture is allowed to stand in ice for about 10 min. Then a cooled solution of 1.92 g. (0.01 mole) of N-ethyl-N-(2-methylaminoethyl)-m-toluidine in 1 ml. of acetic acid is added slowly with stirring. After the addition, the dark red mixture is stirred in ice for several minutes. Excess sodium bicarbonate is then added slowly to the reaction and the orange solid is collected and washed with water. The crude product is separated into fast- and slow-moving fractions by column chromatography, using silica gel. The slow-moving fraction is collected and used in Step 2.

Step 2: The acid chloride compound of Example 1-A (0.78 g., 0.00149 mole) is dissolved in 75 ml. of tetrahydrofuran, and 0.55 g. (0.00149 mole) of the purified azo dye of Step 1 and 0.38 g. (0.003 mole) of N,N-diisopropylethylamine are added. The mixture is stirred at room temperature for 3 hr. At the end of this period, a clear orange solution is obtained. The solution is concentrated to a small volume. The concentrate is applied to a column of silica gel and eluted with acetonitrile to yield 1.0 g. of orange-colored Compound I.

EXAMPLE 2:

Preparation of Compound II

Step 1: Compound 2-A and N,N'-dimethylethylenediamine are reacted in the same manner as described in Step 1, Example 4.

Compound 2-A is as follows:

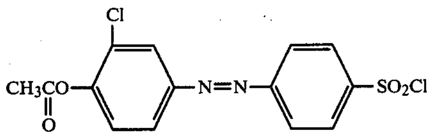

Step 2: To a slurry of 1.18 g. (0.00284 mole) of the yellow dye.HCl of Step 1 in 75 ml. of tetrahydrofuran is added 0.588 g. (0.00568 mole) of anhydrous sodium carbonate followed by about 5 ml. of water. The mixture is stirred for a few minutes until all of the material has dissolved, and 1.47 g. (0.00284 mole) of the acid chloride 1A of Example 1-A in 50 ml. of tetrahydrofuran are added dropwise. After the addition, the reaction is stirred at room temperature for 30 min. and then anhydrous hydrogen chloride is passed in until the mixture becomes acidic. The solution is decanted from some insoluble salts and concentrated on a rotary evaporator. The residue is dissolved in dichloromethane and applied to a dry column of silica gel. Upon elution with a 1:1 mixture of acetone and ethyl acetate, a yellow band is collected and concentrated. The yield of Compound II is 1.5 g.

EXAMPLE 3:

Preparation of Compound III

Step 1: A solution of 9.64 g. (0.02 mole) of Compound 3-A in 75 ml. tetrahydrofuran is mixed with 5.04 g. (0.05 mole) of N,N-dimethyl-1,3-propanediamine and 7.74 g. (0.06 mole) of diisopropylaminoethylamine. A mild exotherm results, yielding magenta solution and a gummy precipitate. The mixture is heated in an oil bath for 1 hr., cooled and filtered. The residue is washed with tetrahydrofuran. The washings and filtrate are combined and concentrated to a purple syrup.

Compound 3-A is as follows:

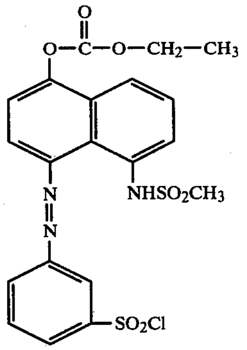

Compound 3A, 3-(4-hydroxy-8-methylsulfonamidonaphthylazo)benzenesulfonyl chloride, can be prepared in the following manner. The product of the reaction of 5-amino-1-naphthol and methanesulfonyl chloride is dissolved in alkali and precipitated with acid. The resulting 5-methylsulfonamido-1-naphthol is coupled with diazotized metanilic acid. The product of the coupling reaction is treated with ethyl chloroformate to block the free hydroxyl group and then it is reacted with a mixture of thionyl chloride and dimethylformamide to yield the desired Compound 3A.

Step 2: The syrup from Step 1 is warmed gently at reflux for 1 hr. with 15 g. of ethyl chloroformate and 125 ml. of tetrahydrofuran. Then 5.2 g. (0.04 mole) of N,N-diisopropylethylamine are added and the mixture is refluxed gently for 1 additional hour. The reaction mixture is concentrated to a syrup and chromatographed on a silica gel column, using acetone to elute front-running material which crystallizes.

Step 3: The product of Step 2 (1.50 g.) and 1.50 g. of potassium hydroxide pellets are refluxed for 2 hr. in a mixture of 60 ml. methanol and 15 ml. water. An additional 4.5 g. of potassium hydroxide are added and gentle refluxing is continued for 2 hr. At the end of this time the methanol is distilled off, the residue is diluted to 100 ml. with water, and an additional 4.0 g. potassium hydroxide are added to make about a 10% solution. The mixture is heated overnight on an oil bath at reflux. After cooling, the reaction mixture is slowly acidified with concentrated HCl followed by 5% HCl until the magenta solution turns orange, giving a precipitate of fine orange needles. After standing for 30 min., the crystals are collected and dried, yielding 1.15 g. of product.

Step 4: To a slurry of 0.990 g. (0.00187 mole) of the product of Step 3 in 50 ml. of tetrahydrofuran is added 0.396 g. (0.00324 mole) of anhydrous sodium carbonate, followed by about 2 ml. of water. When all the material has dissolved, a solution of 0.974 g. (0.00787 mole) of the acid chloride 1A of Example 1-A in 35 ml. of tetrahydrofuran is added dropwise. After stirring at toom temperature for about 30 min., the mixture is made acidic with anhydrous hydrogen chloride. The solution is concentrated on a rotary evaporator and the residue is dissolved in dichloromethane. The solution is chromatographed on a column of silica gel. The eluted product is Compound III.

EXAMPLE 4:

Preparation of Compound IV

Step 1: To a stirred solution at room temperature of 39.0 g. (0.44 mole) of N,N'-dimethylethylenediamine and 5.68 g. (0.044 mole) of N,N-dimethylethylamine in tetrahydrofuran are added 17.8 g. (0.0417 mole) of Compound 4-A in portions over a period of 5 min. After stirring for 30 min. at room temperature, the mixture is filtered and the filtrate is concentrated to a syrup. The syrup is triturated in three 250-ml. portions of a 5:1 mixture of ether and ligroine (B.P. 35°-55° C.). The residual syrup is treated with 500 ml. of a 2% aqueous HCl solution to yield a yellow crystalline product which is cooled to 0°C. with stirring, filtered and dried. The yield of product is 13.3 g.

Compound 4-A is:

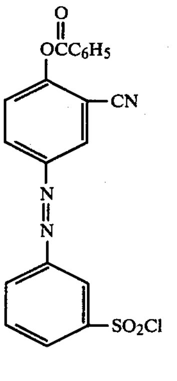

Step 2: The product of Step 1 is reacted with the acid chloride 1A of Example 1-A in the manner of Step 2 of Example 2.

Step 3: To a solution of 1.0 g. (0.0012 mole) of the product of Step 2 in 150 ml. acetone is added 0.5 g. pyridine followed by 0.17 g. (0.0012 mole) of benzoyl chloride. The mixture is stirred for 30 min. and concentrated under reduced pressure. The residue is dissolved in dichloromethane, applied to a column of silica gel and eluted with a mixture of 25:75 ethyl acetate and dichloromethane. The yield is 1.0 g. of Compound IV.

EXAMPLE 5:

Preparation of Compound V

Step 1: Compound 3-A is reacted with N,N'-dimethylethylenediamine according to the procedure of Step 1 of Example 4.

Step 2: The product of Step 1 above is reacted with the acid chloride product of Example 1-A in the manner of Step 2 of Example 2.

Step 3: To a solution of 1.23 g. (0.00127 mole) of the product of Step 2 is added 0.05 g. pyridine followed by 0.178 g. (0.00127 mole) of benzoyl chloride. The mixture is stirred for 30 min. and concentrated under reduced pressure. The residue is dissolved in dichloromethane, applied to a column of silica gel and eluted with a mixture of 25:75 ethyl acetate and dichloromethane. The yield of Compound V is 0.92 g.

EXAMPLE 6:

Preparation of Compound VI

Step 1: Compound 6-A is reacted with N,N'-dimethylethylenediamine as described in Step 1 of Example 4, followed by Steps 2 and 3 of Example 4.

Compound 6-A is :

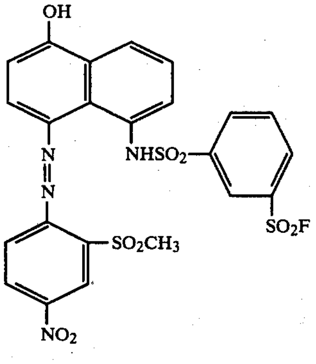

Compound 6A, 3-[5-hydroxy-8-(2-methylsulfonyl-4-nitrophenylazo)naphthylsulfamoyl]benzenesulfonyl fluoride, is prepared by coupling diazotized 2-methylsulfonyl-4-nitroaniline with 5-(3-fluorosulfonylphenylsulfonamido)-1-naphthol, made by reacting 5-amino-1-naphthol wiith 3-chlorosulfonylbenzenesulfonyl fluoride.

EXAMPLE 7

A photographic element is prepared by coating on a cellulose acetate film support a layer containing a gelatinous negative silver halide (0.8 micron bromide) emulsion at 158 mg. silver/ft.$^2$ and 183 mg. gelatin/ft.$^2$, 1-phenyl-3-pyrazolidone at 15 mg./ft.$^2$, Compound I at 50 mg./ft.$^2$ dissolved in diethyl lauramide at 50 mg./ft.$^2$.

The photographic element is exposed to a graduated-density test object and processed at room temperature with an aqueous solution comprising 70 g./l. potassium hydroxide, 40 g./l. potassium bromide, 30 g./l. hydroxyethyl cellulose, and water to 1 liter, while in contact with a mordanted receiver. Upon separation of the elements, a substantially lower rate of release of the diffusible dye in the oxidized areas is exhibited by a well-defined positive yellow dye image in the receiver.

EXAMPLE 8

The procedure of Example 7 is repeated except 50 mg. Compound II are used in preparing the photographic element in place of Compound I. In addition, 7 mg./ft.$^2$ of 5-(2-cyanoethylthio)-1-phenyltetrazole dissolved in tricresyl phosphate at 21 mg./ft.$^2$ are incorporated into the emulsion layer. A well-defined positive dye image is obtained in the receiver sheet which exhibits a low release rate of dye in the areas where Compound II has been oxidized.

EXAMPLE 9

The procedure of Example 8 is repeated except Compound II is replaced with 38 mg./ft.$^2$ Compound III dissolved in 38 mg./ft.$^2$ diethyl lauramide. Upon separation of the receiver sheet from the negative photographic element, a well-defined magenta dye image is obtained in the receiver.

EXAMPLE 10

A photographic element is prepared as follows:

(1) transparent film support;

(2) layer containing a red-sensitive negative silver halide emulsion at 158 mg. silver/ft.$^2$ (0.4 micron AgBr), gelatin at 183 mg./ft.$^2$, Compound III at 38 mg./ft.$^2$ dissolved in diethyl lauramide at 38 mg./ft.$^2$, 1-phenyl-3-pyrazolidone at 15 mg./ft.$^2$, and 5-(2-cyanoethylthio)-1-phenyltetrazole at 7 mg./ft.$^2$ dissolved in tricresyl phosphate at 21 mg./ft.$^2$;

(3) layer containing gelatin at 150 mg./ft.$^2$, 2,5-di-sec-dodecyl hydroquinone at 70 mg./ft.$^2$ dissolved in diethyl lauramide at 28 mg./ft.$^2$ and a yellow filter dye at 100 mg./ft.$^2$;

(4) layer containing a blue-sensitive negative silver halide emulsion at 158 mg. Ag/ft.$^2$ (0.4 micron AgBr), gelatin at 183 mg./ft.$^2$, Compound II at 50 mg./ft.$^2$ dissolved in diethyl lauramide at 50 mg./ft.$^2$, 1-phenyl-3-pyrazolidone at 15 mg./ft.$^2$, and 5-(2-cyanoethylthio)-1-phenyltetrazole at 7 mg./ft.$^2$ dissolved in tricresyl phosphate at 21 mg./ft.$^2$;

(5) layer containing gelatin at 82 mg./ft.$^2$.

The negative photographic element is exposed to a multicolor, graduated-density test object and processed as described in Example 7. Upon separation of the elements, a substantially lower rate of release of the diffusible dye from the oxidized compound is exhibited by a well-defined positive image in the receiver element exhibiting color separation.

EXAMPLE 11

A multicolor photographic element is prepared by coating a photographic film support with the following layers in order from the support:

(1) layer containing a red-sensitive negative silver halide emulsion (1.2 micron average grain AgBr) at 150 mg. silver/ft.$^2$, gelatin at 170 mg./ft.$^2$, Compound VI at 60 mg./ft.$^2$ dissolved in diethyl lauramide at 30 mg./ft.$^2$, 1-phenyl-3-pyrazolidone at 15 mg./ft.$^2$, and 5-(2-cyanoethylthio)-1-phenyltetrazole at 12 mg./ft.$^2$ dissolved in tricresyl phosphate at 36 mg./ft.$^2$;

(2) layer containing gelatin at 70 mg./ft.$^2$ and 2,5-di-sec-dodecyl hydroquinone at 70 mg./ft.$^2$ dissolved in diethyl lauramide at 23 mg./ft.$^2$;

(3) layer containing a green-sensitive negative silver halide emulsion (1.2 micron average grain AgBr) at 150 mg. silver/ft.$^2$, gelatin at 170 mg./ft.$^2$, Compound V at 45 mg./ft.$^2$ dissolved in diethyl lauramide at 23 mg./ft.$^2$, 1-phenyl-3-pyrazolidone at 15 mg./ft.$^2$, and 5-(2-cyanoethylthio)-1-phenyltetrazole at 12 mg./ft.$^2$ dissolved in tricresyl phosphate at 36 mg./ft.$^2$;

(4) layer containing gelatin at 70 mg./ft.$^2$, 2,5-di-sec-dodecyl hydroquinone at 70 mg./ft.$^2$ dissolved in diethyl lauramide at 23 mg./ft.$^2$, and Carey Lea silver at 17 mg./ft.$^2$;

(5) layer containing a blue-sensitive negative silver halide emulsion (1.2 micron average grain AgBr) at 150 mg./ft.$^2$, gelatin at 170 mg./ft.$^2$, Compound IV at 70 mg./ft.$^2$ dissolved in diethyl lauramide at 35 mg./ft.$^2$, 1-phenyl-3-pyrazolidone at 15 mg./ft.$^2$, and 5-(2-cyanoethylthio)-1-phenyltetrazole at 12 mg./ft.$^2$ dissolved in tricresyl phosphate at 36 mg./ft.$^2$;

(6) layer containing gelatin at 50 mg./ft.$^2$.

The photographic element is exposed to a multicolor, graduated-density test object and processed at room temperature with a viscous aqueous solution comprising 50 g. potassium hydroxide and 30 g. hydroxyethyl cellulose/l. of water, while in contact with a mordanted receiver comprising a polyethylene-coated paper support coated with a layer containing copoly[styrene-N-benzyl-N,N-dimethyl-N-(3-maleimidopropyl)ammonium chloride] at 200 mg./ft.$^2$ and gelatin at 200 mg./ft.$^2$ and overcoated with a layer containing 50 mg./ft.$^2$ gelatin.

Upon separation of the photographic element from the receiver, the receiver is washed, and a well-defined multicolor reproduction of the test object is obtained.

EXAMPLE 12

An integral color transfer photographic element is prepared by coating a transparent film support with the following layers in order from the support:

(1) layer containing the mordant copoly[styrene-N-benzyl-N,N-dimethyl-N-(3-maleimidopropyl)ammonium chloride] at 200 mg./ft.$^2$ and gelatin at 100 mg./ft.$^2$;

(2) layer containing titanium dioxide at 2000 mg./ft.$^2$ and gelatin at 200 mg./ft.$^2$;

(3) layer containing carbon at 250 mg./ft.$^2$ and gelatin at 156 mg./ft.$^2$;

(4) layer containing a red-sensitive negative silver halide emulsion (1.2 micron average grain AgBr) at 150 mg. silver/ft.$^2$, gelatin at 170 mg./ft.$^2$, Compound VI at 60 mg./ft.$^2$ dissolved in diethyl lauramide at 30 mg./ft.$^2$, 1-phenyl-3-pyrazolidone at 15 mg./ft.$^2$, and 5-(2-cyanoethylthio)-1-phenyltetrazole at 12 mg./ft.$^2$ dissolved in tricresyl phosphate at 36 mg./ft.$^2$;

(5) layer containing gelatin at 70 mg./ft.$^2$ and 2,5-di-sec-dodecyl hydroquinone at 70 mg./ft.$^2$ dissolved in diethyl lauramide at 23 mg./ft.$^2$;

(6) layer containing a green-sensitive negative silver halide emulsion (1.2 micron average grain AgBr) at 150 mg. silver/ft.$^2$, gelatin at 170 mg./ft.$^2$, Compound V at 45 mg./ft.$^2$ dissolved in diethyl lauramide at 23 mg./ft.$^2$, 1-phenyl-3-pyrazolidone at 15 mg./ft.$^2$, and 5-(2-cyanoethylthio)-1-phenyltetrazole at 12 mg./ft.$^2$ dissolved in tricresyl phosphate at 36 mg./ft.$^2$;

(7) layer containing gelatin at 70 mg./ft.$^2$, 2,5-di-sec-dodecyl hydroquinone at 70 mg./ft.$^2$ dissolved in diethyl lauramide at 23 mg./ft.$^2$, and Carey Lea silver at 17 mg./ft.$^2$;

(8) layer containing a blue-sensitive negative silver halide emulsion (1.2 micron average grain AgBr) at 150 mg./ft.$^2$, gelatin at 170 mg./ft.$^2$, Compound IV at 70 mg./ft.$^2$ dissolved in diethyl lauramide at 35 mg./ft.$^2$, 1-phenyl-3-pyrazolidone at 15 mg./ft.$^2$, and 5-(2-cyanoethylthio)-1-phenyltetrazole at 12 mg./ft.$^2$ dissolved in tricresyl phosphate at 36 mg./ft.$^2$;

(9) layer containing gelatin at 50 mg./ft.$^2$.

The photographic element is exposed to a multicolor, graduated-density test object and processed at room temperature by rupturing a pod containing a viscous solution comprising 100 g. potassium hydroxide and 30 g. hydroxyethyl cellulose/l. of water between the photographic element and an opaque cover sheet.

After a few minutes, a well-defined multicolor reproduction of the test object is viewed through the transparent support of the photographic element.

EXAMPLE 13

The photographic elements can be processed to provide a good positive image in the exposed element by a reversal process.

A photographic element is prepared by coating the layers on the support as follows:

(1) support;

(2) layer containing 40 mg./ft.$^2$ of Compound XIV dissolved in 20 mg./ft.$^2$ of diethyl lauramide, 10 g./ft.$^2$ of 5-(2-cyanoethylthio)-1-phenyltetrazole dissolved in 30 mg./ft.$^2$ of tricresyl phosphate, and gelatin at 125 mg./ft.$^2$;

(3) layer containing a negative silver bromoiodide emulsion coated at 100 mg./ft.$^2$ based on silver and gelatin at 100 mg./ft.$^2$;

(4) layer containing gelatin at 50 mg./ft.$^2$.

Compound XIV is as follows:

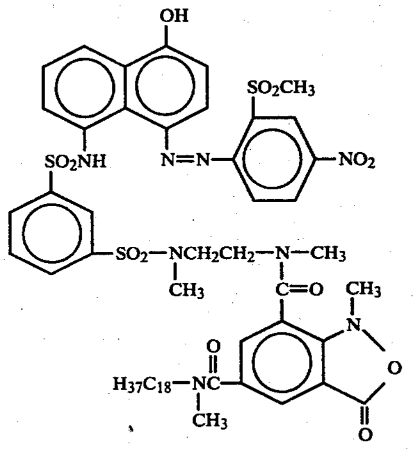

A sample of the photographic element is exposed imagewise to a step wedge and processed in Kodak Developer DK-50 at a pH of 9.0 for 15 min. at 20° C. The element is then washed for 5 min., dried, and exposed to room light. The sample is then brought into interfacial contact with an image-receiving element containing a dye mordant with a viscous processing solution inserted between the photographic element and the image-receiving element. The viscous processing solution has the formula:

| | |
|---|---|
| potassium hydroxide | 60 g. |
| hydroxyethyl cellulose | 30 g. |
| 4-hydroxymethyl-4-methyl-1-phenyl-3-pyrazolidone | 3 g. |
| sodium thiosulfate | 3 g. |
| potassium bromide | 10 g. |
| water to 1 liter | |

After 10 min. the elements are separated. The receiver is washed and dried to provide a good negative image. The photosensitive element is washed, bleached, washed, fixed, washed and dried. A good positive cyan dye image is obtained in this element.

EXAMPLE 14

Intermediates can be prepared for use in Example 1-B by the following procedure:

5,7-dicarboxy-2,1-benzisoxazolin-3-one

To a stirred solution of 12.8 g. of nitrotrimesic acid (prepared by alkaline potassium permanganate oxidation of nitromesitylene) in 200 ml. of water containing 30 g. of sulfuric acid are added 6.5 g. of zinc dust in portions at such a rate so as to maintain a temperature of about 25° C. After the addition, the mixture is stirred for an additional 1 hr. After this time, 200 ml. of ethyl acetate are added and the mixture is rapidly stirred for 15 min. The reaction is then filtered by suction through a pad of filter aid. The organic layer is separated, dried and concentrated under reduced pressure, leaving 9.6 g. of crude product which is used directly in the next step.

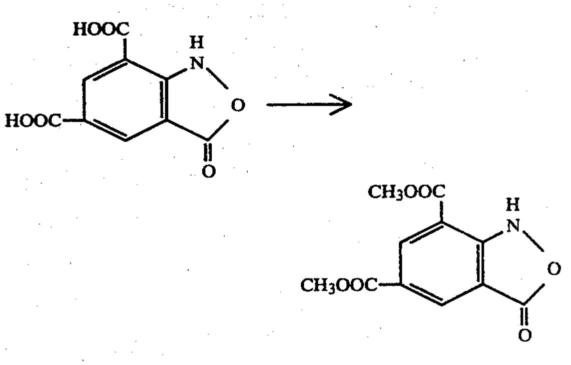

5,7-dicarboxy-2,1-benzisoxazolin-3-one dimethyl ester

A slurry of 10.1 g. of 5,7-dicarboxy-2,1-benzisoxazolin-3-one in 75 ml. of methanol containing dry hydrogen chloride gas is boiled under reflux overnight. After this time the reaction is cooled to room temperature and the solid is collected and washed with a little methanol to give 9.8 g. (86%) of 5,7-dicarboxy-2,1-benzisoxazolin-3-one dimethyl ester, m.p. 166°-167° C. dec.

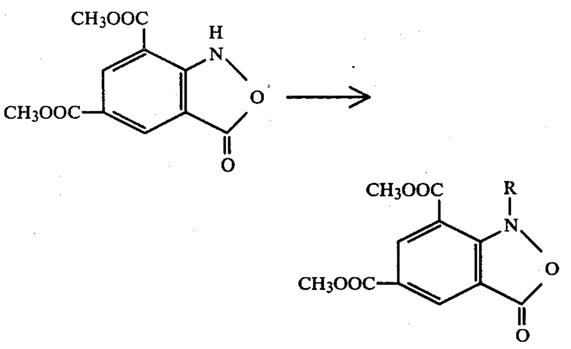

1-ethyl-5,7-dicarboxy-2,1-benzisoxazolin-3-one dimethyl ester

To a solution of 25.1 g. of 5,7-dicarboxy-2,1-benzisoxazolin-3-one dimethyl ester in 250 ml. of dimethylformamide are added 6.9 g. of anhydrous potassium carbonate, followed by 18 g. of diethyl sulfate. The mixture is stirred and heated to about 100° C. until the orange color fades (about 30 min.). The cooled reaction mixture is poured into 1000 ml. of rapidly stirred aqueous sodium bicarbonate solution. The solid is collected and washed well with water and dried. The crude product is recrystallized from 60:40 ethanol:water to give 20.7 g. (74%) of white crystals of 1-ethyl-5,7-dicarboxy-2,1-benzisoxazolin-3-one dimethyl ester; m.p. 83°-84° C.

Similarly prepared using the appropriate dialkyl sulfate are the following 1-substituted 2,1-benzisoxazolin-3-ones:

1-methyl-5,7-dicarboxy-2,1-benzisoxazolin-3-one dimethyl ester; m.p. 151°-152° C.

1-isopropyl-5,7-dicarboxy-2,1-benzisoxazolin-3-one dimethyl ester; m.p. 122°-124° C.

1-(2-fluoroethyl)-5,7-dicarboxy-2,1-benzisoxazolin-3-one dimethyl ester 1-ethyl-5,7-dicarboxy-2,1-benzisoxazolin-3-one To a solution of 13.95 g. of 1-ethyl-5,7-dicarboxy-2,1-benzisoxazolin-3-one dimethyl ester in 50 ml. of tetrahydrofuran are added 125 ml. of methanol. Nitrogen gas is bubbled into the stirred solution for several minutes. A solution of 6.0 g. of soidum hydroxide in 50 ml. of water is then added, and the solution is stirred at room temperature with continued nitrogen bubbling for 15 min. The reaction mixture is then made acidic with concentrated hydrochloric acid, followed by the addition of 300 ml. of water. The mixture is then extracted with ethyl acetate. The extracts are washed with water and dried over anhydrous calcium sulfate and filtered. The solvent is removed under reduced pressure, leaving 11.6 g. (93%) of white 1-ethyl-5,7-dicarboxy-2,1-benzisoxazolin-3-one; m.p. 320° C. dec.

5,7-bis(chloroformyl)-1-ethyl-2,1-benzisoxazolin-3-one

A slurry of 10.05 g. of 1-ethyl-5,7-dicarboxy-2,1-benzisoxazolin-3-one in 75 ml. of thionyl chloride containing 5 drops of dimethylformamide is boiled under reflux for 30 min. The clear yellow solution is concentrated under reduced pressure. The residue is treated with benzene and again concentrated to dryness. The resulting yellow oil is used directly in the next step.

7-carboxy-1-ethyl-2,1-benzisoxazolin-3-one-5-N-methyloctadecylcarboxamide

To a solution of the above bis-acid chloride in 200 ml. of tetrahydrofuran cooled in an ice bath is added dropwise a solution of 22.6 g. of N-methyloctadecylamine and 9 g. of triethylamine in 100 ml. of tetrahydrofuran. After the addition, the reaction is made acidic with dry hydrogen chloride gas. The precipitated amine hydrochlorides are removed by filtration and the filtrate is concentrated under reduced pressure to a solid which is used directly in the next step.

A 10% solution of the above bis-amide in warm ethanol is treated with an equal volume of aqueous sodium hydroxide (3 equivalents) under a good nitrogen atmosphere. The reaction mixture is stirred at room temperature under nitrogen for 15 min. and then made acidic with hydrochloric acid. The white precipitate is collected, washed well with water and dried. The dried product is then treated with tetrahydrofuran and the insoluble N-methyloctadecylamine hydrochloride is removed by filtration. The tetrahydrofuran filtrate is concentrated under reduced pressure. The residue is recrystallized from ethanol-petroleum ether to give white 7-carboxy-1-ethyl-2,1-benzisoxazolin-3-one-5-N-methyloctadecylcarboxamide; m.p. 73°-75° C.

Using procedures similar to the above, the following N-substituted 7-carboxy-2,1-benzisoxazolin-3-one-5-N-methyloctadecylcarboxamides are prepared:

7-carboxy-1-methyl-2,1-benzisoxazolin-3-one-5-N-methyloctadecylcarboxamide 7-carboxy-1-isopropyl-2,1-benzisoxazolin-3-one-5-N-methyloctadecylcarboxamide 7-carboxy-1-(2-fluoroethyl)-2,1-benzisoxazolin-3-one-5-N-methyloctadecylcarboxamide Each of the above acid amides are then reacted separately by boiling in excess neat thionyl chloride containing a trace of dimethylformamide for 30 min. to 1 hr. The excess thionyl chloride is removed under reduced pressure, leaving the desired acid chlorides as solids or oils which are used directly to prepare compounds by the procedure of Example 1-B.

EXAMPLE 15

Another procedure for preparing compounds of this invention is as follows:

I. Preparation of 7-carboxy-1-methyl-5-octadecyloxy-2,1-benzisoxazolin-3-one

A. Dimethyl 5-hydroxy isophthalate

A slurry of 36 g. of 5-hydroxyisophthalic acid in 100 ml. of methanol containing dry hydrogen chloride gas is boiled under reflux for 20 hr. After this time, the reaction is cooled to room temperature. The solid cake which has formed is broken up and the product is collected and washed with a little cold methanol; m.p. 158°-159° C.

B. Dimethyl 5-hydroxy-2-nitroisophthalate

To a suspension of 60 g. of dimethylisophthalate in 600 ml. of methylene chloride are added 200 ml. of concentrated nitric acid, and the mixture is rapidly stirred at room temperature for about 45 min. After this time, 300 ml. of ice water are added, followed by 700 ml. of ethyl acetate. The organic layer is separated, washed with two portions of saturated brine, and dried over anhydrous sodium sulfate. The solvent is removed under reduced pressure, leaving a sticky solid which is triturated with 100 ml. of warm benzene. The insoluble material is collected and washed with benzene to give 19.5 g. (27%) of white to pale yellow solid, m.p. 183°-186° C.

C. Dimethyl 2-nitro-5-octadecyloxyisophthalate

To a solution of 19.5 g. of dimethyl-5-hydroxy-2-nitroisophthalate in 150 ml. of dry ethanol are added 8.8 g. of tetramethylguanidine, followed by 29.1 g. of octadecyliodide. The mixture is refluxed for 16 hr., cooled, and poured into 700 ml. of water. The precipitate is collected and washed well with water. The dried crude product is triturated with methanol. The insoluble solid is collected, giving 32.6 g. of product, m.p. 65°-68° C., which is used without further purification.

D. 7-carboxy-5-octadecyloxy-2,1-benzisoxazolin-3-one methyl ester

To a solution of 20.4 g. of dimethyl-2-nitro-5-octadecyloxyisophthalate in 100 ml. of methylene chloride and 100 ml. of ether is added a solution of 8 g. of ammonium chloride in 175 ml. of water. The mixture is rapidly stirred and 16 g. of zinc dust are added all at once. The reaction is stirred at room temperature for 16 hr. After this time, the orange mixture is filtered by suction through a celite pad. To the orange filtrate are added 100 ml. of dilute hydrochloric acid, and the mixture is shaken until the orange color fades to yellow. The yellow organic layer is separated, dried over anhydrous calcium sulfate and filtered. The solvent is removed under reduced pressure. The remaining residue is dissolved in 125 ml. of hot methanol. The solution is cooled somewhat and 50 ml. of petroleum ether are added. The solution is allowed to cool slowly to −12° C. in a freezer. The yellow solid which has formed is collected and washed with cold methanol. Yield 10.6 g.; m.p. 89°-90° C. dec.

E. 7-carboxy-1-methyl-5-octadecyloxy-2,1-benzisoxazolin-3-one methyl ester

To a slurry of 1.85 g. of 7-carboxy-5-octadecyloxy-2,1-benzisoxazolin-3-one methyl ester in 30 ml. of dimethylformamide is added 0.28 g. of powdered anhydrous potassium carbonate. The deep red mixture is warmed to about 40° C., whereupon all the material goes into solution. With stirring and at a temperature of about 40° C., 0.63 g. of dimethylsulfate is added dropwise. The red color is rapidly discharged. The reaction is then cooled to room temperature and poured into 200 ml. of rapidly stirred icecold 1% hydrochloric acid. The precipitate is collected, washed well with water and used directly in the next step.

F. 7-carboxy-1-methyl-5-octadecyloxy-2,1-benzisoxazolin-3-one

To a solution of the above crude 7-carboxy-1-methyl-5-octadecyloxy-2,1-benisoxazolin-3-one methyl ester in 10 ml. of tetrahydrofuran are added 25 ml. of ethanol. Nitrogen is bubbled into the solution for about 15 min. With continued nitrogen bubbling, a solution of 0.4 g. of sodium hydroxide in 5 ml. of water is added. The mixture is rapidly stirred under nitrogen at room temperature for 15 min., then carefully made acidic with dilute hydrochloric acid and poured into 100 ml. of water. The solid is collected and washed with water. The dried solid is recrystallized from benzene, giving 0.5 g. of white to pale yellow solid product; m.p. 137°-139° C.

G. 7-chloroformyl-1-methyl-5-octadecyloxy-2,1-benzisoxazolin-3-one

A mixture of 461 mg. of 7-carboxy-1-methyl-5-octadecyloxy-2,1-benzisoxazolin-3-one and 25 ml. of thionyl chloride containing 1 drop of dimethylformamide is boiled under reflux for 15 min. The mixture is concentrated under reduced pressure to give the acid chloride as a yellow solid which is used directly.

II. Preparation of Compound VII

A solution of 7-chloroformyl-1-methyl-5-octadecyloxy-2,1-benzisoxazolin-3-one (prepared from 461 mg. of the acid) in 10 ml. of tetrahydrofuran is added dropwise to a stirred mixture of 712 mg. of dye (prepared as in Example 6, Step 1) and 250 mg. of triethylamine in 20 ml. of tetrahydrofuran. After the addition, the reaction is made acidic with dry hydrogen chloride gas and the precipitated amine hydrochloride is removed by filtration. The filtrate is concentrated under reduced pressure and the residue is dissolved in 80:20 ethyl acetate:acetone and filtered through a short column of silica gel. The deep cyan filtrate is concentrated to dryness and the residue is dissolved in a small amount of methylene chloride. Petroleum ether is slowly added to the methylene chloride solution until no more solid forms. The product is collected to give 615 mg. of green-blue solid with a metallic luster.

EXAMPLE 16

Compounds in accordance with this invention which contain dye precursors such as color couplers or oxichromic compounds can be prepared, such as by the following procedure:

A. Preparation of 2-(N-benzyloxycarbonyl-N-methylamino)ethane sulfonyl chloride

To a solution of 2.47 g. of a 65% aqueous solution of N-methyltaurine sodium salt (0.01 mole) in 25 ml. of water are added 1.06 g. of anhydrous sodium carbonate. The solution is rapidly stirred and 1.8 g. of benzyl chloroformate are added. The mixture is stirred at room temperature for 1 hr., after which time the reaction is extracted once with ether to remove organic soluble material. The remaining aqueous solution is concentrated to dryness under reduced pressure. The dry white solid is suspended in 50 ml. of dimethylformamide, and with stirring 3 ml. of thionyl chloride are added. The mixture is stirred at room temperature for 30 min., then poured into crushed ice. The aqueous mixture is extracted with ether and the combined ether extracts are back-extracted with two portions of water to remove dimethylformamide. The dried ether extracts are concentrated under reduced pressure to a nearly colorless oil which is directly pure by NMR and mass spectral analysis.

B. The sulfonyl chloride of part A is then reacted with the following amino compound (the amino compound is readily available from the corresponding nitro compound by catalytic hydrogenation):

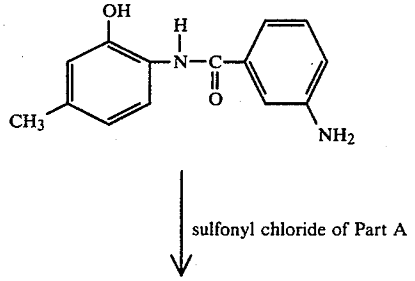

-continued

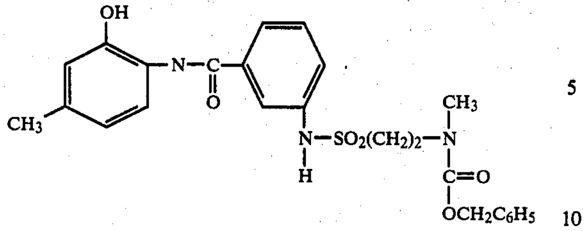

Compound 16B

C-1. If a releasable coupler is desired, Compound 16B can be transformed by catalytic hydrogenolysis which removes the benzyloxycarbonyl protecting group. This compound can then be reacted with the acid chloride of Example 1-A to provide the compound having a releasable color coupler thereon.

C-2. If an oxichromic moiety is desired on the compound, then Compound 16B is reacted with oxidized 2,6-dichloro-p-aminophenol in an alkaline medium to provide the azomethine dye. This compound containing the azomethine dye can then be subjected to catalytic hydrogenation, reducing the dye forming an oxichromic moiety and also providing concomitant hydrogenolysis of the benzyloxycarbonyl protecting function.

This compound containing the oxichromic moiety can then be reacted with the acid chloride of Example 1-A to provide a compound having a releasable oxichromic moiety thereon.

The compounds of C-1 or C-2 can be coated in a photographic element in association with a silver halide layer. The compounds are generally coated at levels of about 50 to 150 mg./ft.$^2$ dissolved in 50 to 150 mg./ft.$^2$ of a solvent such a diethyl lauramide in a gelatin layer containing 50 to 200 mg./ft.$^2$ of silver halide. Exposure and processing of the element as described in Example 12 gives a positive image in the released coupler or oxichromic moiety and a negative image in the unreleased coupler or oxichromic moiety. When the oxichromic moiety diffuses out of the photosensitive layers, such as to a receiver layer, a dye image can be observed upon exposure of the element to air wherein the positive image appears in the receiver layer and a negative image appears in the silver halide layers. Where the coupler diffuses out of the photosensitive layers, such as to an image-receiving layer, the respective positive and negative dye images can be obtained by treating the elements with oxidized color developer such as N-ethyl-N-hydroxyethyl-p-phenylenediamine.

EXAMPLE 17:

In certain embodiments, the benzisoxazolone has a benzyl group substituted in the 1-position and can be made by the following procedure:

I. Preparation of 7-chloroformyl-1-benzyl-5-(N,N'-dihexylcarbamoylmethoxy)-2,1-benzisoxazolin-3-one A. tert-butyl-(3,5-dicarbomethoxy-4-nitrophenoxy-)acetate To a solution of 2.55 g. of dimethyl-5-hydroxy-2-nitroisophthalate (prepared as in Example 15, Part B) in 25 ml. of acetone is added 0.69 g. of anhydrous potassium carbonate, followed by 1.95 g. of tert-butylbromoacetate. The mixture is stirred and refluxed for 20 hr. After this time, the cooled reaction mixture is poured with rapid stirring into 200 ml. of ice-cold 1% hydrochloric acid. The solid is collected and washed well with water. Yield 3.4 g.; m.p. 106°-108° C.

B. (3,5-dicarbomethoxy-4-nitrophenoxy)acetic acid

To a solution of 3.28 g. of tert-butyl-(3,5-dicarbomethoxy-4-nitrophenoxy)acetate in 20 ml. of benzene are added 100 mg. of p-toluenesulfonic acid monohydrate. The solution is stirred and refluxed for 30 min. After this time, the reaction is cooled and the precipitate collected. Yield 2.4 g.; m.p. 151°-152° C.

C. (3,5-dicarbomethoxy-4-nitrophenoxy)acetyl chloride

A solution of (3,5-dicarbomethoxy-4-nitrophenoxy)acetic acid in neat thionyl chloride containing a trace of dimethylformamide is boiled under reflux for 30 min. The excess thionyl chloride is removed under reduced pressure, leaving the acid chloride as an oil which is used directly.

D. (3,5-dicarbomethoxy-4-nitrophenoxy)-N,N-dihexylacetamide

A stirred solution of (3,5-dicarbomethoxy-4-nitrophenoxy)acetyl chloride in tetrahydrofuran, cooled in an ice bath, is treated dropwise with a tetrahydrofuran solution containing 1 equivalent each of dihexylamine and triethylamine. After the addition, the precipitated amino hydrochloride is removed by filtration and the tetrahydrofuran filtrate is concentrated under reduced pressure to an oil which is used directly in the next step.

E. (3,5-dicarboxy-4-nitrophenoxy)-N,N-dihexylacetamide

A solution of crude (3,5-dicarbomethoxy-4-nitrophenoxy)-N,N-dihexylacetamide in ethanol is treated with aqueous sodium hydroxide (3 equivalents) at room temperature for 15 min. After this time the reaction is poured into cold dilute hydrochloric acid. The diacid product which precipitates is collected and washed well with water; m.p. 180°-184° C.

F. [3,5-bis(p-methoxybenzyloxycarbonyl)-4-nitrophenoxy]-N,N-dihexylacetamide

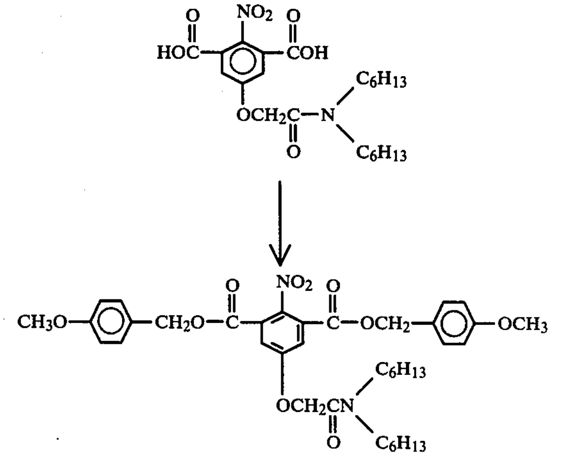

To a solution of (3,5-dicarboxy-4-nitrophenoxy)N,N-dihexylacetamide in dimethylformamide containing two equivalents of triethylamine are added two equivalents of p-methoxybenzylchloride. The mixture is stirred and heated to about 100° C. for 1 hr. After this time, the reaction is cooled to room temperature and poured into ice water. The aqueous mixture is extracted with 2 portions of methylene chloride. The combined extracts are back-extracted with water to remove dimethylformamide, dried over anhydrous calcium sulfate, filtered and concentrated under reduced pressure. The remaining oil which was not induced to crystallize is analyzed by NMR and used directly in the next step.

G. 7-carboxy-1-benzyl-5-(N,N'-dihexylcarbamoylmethoxy)-2,1-benzisoxazolin-3-one-p-methoxybenzyl ester

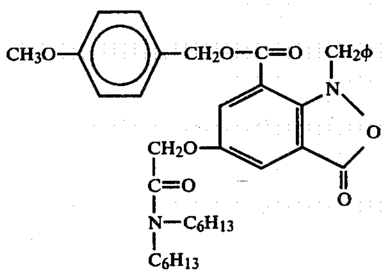

To a solution of 0.01 mole of [3,5-bis(p-methoxybenzyloxycarbonyl)-4-nitrophenoxy]-N,N-dihexylacetamide in 25 ml. of methylene chloride and 25 ml. of ethyl ether is added a solution of 2 g. of ammonium chloride in 40 ml. of water. The mixture is rapidly stirred and 4 g. of zinc dust are added all at once. The reaction is stirred at room temperature for 3 hr., then filtered by suction through a celite pad. The orange filtrate is shaken with dilute hydrochloric acid until the initial orange color fades to yellow. The organic layer is separated and dried over anhydrous calcium sulfate. The solvent is removed under reduced pressure, leaving an oil which is used directly.

The above crude oil is dissolved in 40 ml. of dimethylformamide containing 2.1 g. of triethylamine. The deep red solution is warmed with stirring to about 40° C. and 1.5 g. of benzyl bromide are added dropwise. The red color is rapidly discharged. The reaction mixture is cooled to room temperature and poured into 200 ml. of water. The aqueous mixture is extracted with methylene chloride. The combined, dried extracts are concentrated under reduced pressure to an oil. The oil is dissolved in methylene chloride and applied to a column of silica gel. Elution with methylene chloride and collection of the front-running, highly fluorescent component gives 2.6 g. of the desired product as an oil which did not crystallize.

H. 7-carboxy-1-benzyl-5-(N,N-dihexcarbamoylmethoxy)-2,1-benzisoxazolin-3-one

A solution of 2.6 g. of 7-carboxy-1-benzyl-5-(N,N'-dihexylcarbamoylmethoxy)-2,1-benzisoxazolin-3-one-p-methoxybenzyl ester in 30 ml. of benzene containing 200 mg. of p-toluenesulfonic acid monohydrate is refluxed for 48 hr. After this time, the reaction is cooled to room temperature and the white precipitate which forms is collected and washed with benzene to give 500 mg. of product, m.p. 157°-159° C.

I. 7-chloroformyl-1-benzyl-5-(N,N-dihexylcarbamoylmethoxy)-2,1-benzisoxazolin-3-one A solution of 7-carboxy-1-benzyl-5-(N,N'-dihexylcarbamoylmethoxy)-2,1-benzisoxazolin-3-one in neat oxalyl chloride is boiled for 15 min. The excess oxalyl chloride is boiled for 15 min. The excess oxalyl chloride is removed under reduced pressure to give the acid chloride as an oil which is used directly. II.

The acid chloride of part I—I. is then used in Example 1-B to prepare release compounds containing releasable dyes.

The benzisoxazole compounds containing the dyes can be used in photographic elements, which elements are exposed and processed as described in Example 12 to provide image records in the form of the released dye.

EXAMPLE 18:

Compounds containing photographic reagents can be made by modifying the procedure to accommodate the specific group which is to be released. Compound XII, which contains a releasable mercaptotetrazole, is synthesized according to the following procedure:

Step 1: A 3-liter 3-necked round-bottomed flask equipped with a mechanical stirrer, a reflux condenser and an addition funnel is charged with 141 g. (0.6 mole) of 1-(3-acetamido)phenyl-2-tetrazoline-5-thione and 1400 ml. of tetrahydrofuran (dried over 4A molecular sieves). To this mixture are added 670 ml. (2.4 moles) of sodium bis[2-methoxyethoxy]aluminum hydride dropwise. There is considerable foaming observed during the addition. The reaction is warmed to achieve solution. The reaction is poured into 2 gallons of ice and concentrated hydrochloric acid containing 2 liters of ethyl acetate. The aqueous phase is extracted with three 1-gallon portions of ethyl acetate. The combined organic phase is back-extracted with three 2-liter portions of water. The organic phase is dried over magnesium sulfate, filtered, and concentrated under reduced pressure to a yellow solid. The material is recrystallized from 250 ml. of boiling dichloroethane. There is obtained 101 g. (77%) of bright yellow crystals (m.p. 149°-150° C.).

Step 2: A 2-liter 3-necked round-bottomed flask equipped with a mechanical stirrer and a reflux condenser is charged with 25.5 g. (0.05 mole) of 7-carboxychloride-N-methyl-2,1-benzisoxazolone-5-N-methyloctadecyl carboxamide (Example 1-A) and 250 ml. of tetrahydrofuran (dried over 4A molecular sieves). A solution of 11.05 g. (0.5 mole) of 1-(3-N-ethylamino)-2-tetrazoline-5-thione (Step 1), 4 ml. (0.05 mole) of pyridine (dried over 4A molecular sieves) is added. The reaction is stirred at the ambient temperature for 16 hr. and then heated to reflux for a few minutes to dissolve some solid which has crystallized on the walls of the reaction flask. The warm reaction mixture is poured into 5 liters of ice water containing 50 ml. of concentrated hydrochloric acid. The mixture is then extracted with three 1-liter portions of ethyl acetate. The combined organic phase is back-extracted with three 500-ml. portions of water. The organic phase is dried over anhydrous magnesium sulfate, filtered, and then concentrated under reduced pressure from a 40° C. water bath. The yellow oil is mixed with acetonitrile and reconcentrated as above. The material is then dissolved in hot acetonitrile, treated with Pittsburgh RB carbon and allowed to crystallize. The solid is then recrystallized from acetonitrile. There is obtained 10 g. (29%) of white crystals (m.p. 124°-126° C.) which is Compound XII.

EXAMPLE 19

Ten mg./ft.$^2$ of Compound XII dispersed one-to-one by weight in diethyl lauramide are added to layer 4 which contains a cyan dye redox releaser of an integral receiver element as described in Example 8 and Hass et al, U.S. Ser. No. 439,809.

Samples of the element and a control element which does not contain Compound XII are exposed to a graduated-density multicolor test object and processed according to the procedure described in Example 8 of U.S. Ser. No. 439,809.

Improved reduction in minimum dye densities and improvements in lower scale contrasts are apparent in the elements which contain Compound XII, which are analyzed a few hours after processing.

When Compound XIII is used in film units as described in Examples 11 and 12, improved photographic properties are also obtained such as improved minimum dye densities and improvements in lower scale contrasts.

EXAMPLE 20:

Preparation of Compound X, having a ballast group linked through a sulfone moiety, is as follows:

A. Dimethyl-2-nitro-5-O-dimethylthiocarbamoyloxy isophthalate

To a solution of 160 g. of dimethyl-2-nitro-5-hydroxy isophthalate in 1200 ml. tetrahydrofuran are added 130 g. of N-methylmorpholine followed by 120 g. of dimethylthiocarbamoyl chloride. The mixture is stirred and refluxed for 2½ hr., cooled to room temperature and filtered from precipitated amine hydrochloride. The filtrate is concentrated under reduced pressure. The residue is slurried in 500 ml. of methanol and the insoluble material is collected, washed with methanol and dried, giving 138.2 g. of white product, m.p. 156°-157° C.

B. Dimethyl 2-nitro-5-dimethylcarbamoylthio isophthalate

A stirred slurry of 138 g. of dimethyl 2-nitro-5-dimethylthiocarbamoyloxy isophthalate in 700 ml. of sulfolene is rapidly heated to 200° C. under a nitrogen atmosphere and held at this temperature for 20 min. The dark reaction mixture is then cooled to room temperature and poured into 2500 ml. of rapidly stirred water. The solid is collected and dried, giving 129.5 g. of product, m.p. 139°-143° C., which is used directly.

C. 2-nitro-5-mercaptoisophthalic acid

To a slurry of 129.5 g. of dimethyl-2-nitro-5-dimethylcarbamoylthioisophthalate in 900 ml. of water and 100 ml. of methanol is added a solution of 61 g. of sodium hydroxide in 200 ml. of water. The mixture is stirred and refluxed under nitrogen for 30 min., then cooled to room temperature and carefully made acidic with 165 ml. of concentrated hydrochloric acid. The acidic solution is extracted with two portions of ethyl acetate. The combined dried extracts are concentrated under reduced pressure. The residue is triturated with 200 ml. of benzene and the insoluble material collected and dried, giving 95.2 g. of pale yellow product, m.p. 291°-293° C. dec.

D. 2-nitro-5-octadecylthioisophthalic acid

To a solution of 48.6 g. of 2-nitro-5-mercaptoisophthalic acid in 500 ml. of dimethylformamide under nitrogen are added all at once 61 g. of triethylamine followed immediately by 80 g. of solid octadecyl iodide. The reaction is stirred 15 min., then poured into 2000 ml. of water. The resulting aqueous solution is made acidic with concentrated hydrochloric acid and the solid which forms is collected, washed with water and dried. The dry solid is stirred with 600 ml. of boiling hexane for 1 hr. The mixture is cooled to room temperature and the insoluble material collected, washed with hexane and dried, giving 89.7 g. of product, m.p. 194°-196° C.

E. 2-nitro-5-octadecylsulfonylisophthalic acid

To a stirred slurry of 27.9 g. of 2-nitro-5-octadecylthioisophthalic acid in 300 ml. of acetic acid are added 12.8 g. of 30% hydrogen peroxide. The mixture is heated to 80° C., held at this temperature for 5 hr., then allowed to cool to room temperature. The precipitate is collected, washed with acetic acid and dried to give 23.8 g. of white product, m.p. 203°-205° C.

F. Dimethyl 2-nitro-5-octadecylsulfonylisophthalate

A mixture of 15.6 g. of 2-nitro-5-octadecylsulfonylisophthalic acid and 100 ml. of methanol saturated with dry hydrogen chloride is refluxed under a drying tube for 20 hr. After this time the reaction is cooled to room temperature and the solid is collected, washed with a little methanol and dried, giving 14.2 g. of the diester, m.p. 98°-100° C.

G. 7-carboxy-1-methyl-5-octadecylsulfonyl-2,1-benzisoxazolin-3-one

Dimethyl-2-nitro-5-octadecylsulfonylisophthalate is reductively cyclized using the procedure of Example 15:I-D. The crude 2,1-benzisoxazolin-3-one obtained is treated with excess dimethylsulfate as in the procedure of Example 15-I-E, giving 7-carboxy-1-methyl-5-octadecylsulfonyl-2,1-benzisoxazolin-3-one methyl ester which is hydrolyzed using the procedure of Example 15:-I-F above, giving 7-carboxy-1-methyl-5-octadecylsulfonyl-2,1-benzisoxazolin-3-one, m.p. 177°-179° C.

The acid chloride is prepared as in Example 15:I-G and reacted with the amine-dye hydrochloride using the procedure of Example 15:II, giving Compound X.

EXAMPLE 21:

Preparation of Compound VIII, having a ballast group linked through a sulfonamide moiety, is as follows:

A. Dimethyl-2-nitro-5-mercaptoisophthalate

A solution of 5 g. of 2-nitro-5-mercaptoisophthalic acid in 50 ml. of methanol saturated with dry hydrogen chloride is refluxed under a drying tube for 20 hr. The reaction is then cooled to room temperature and the precipitate is collected, washed with a little methanol and dried to give 3.4 g. of the diester, m.p. 117°-119° C.

B. Dimethyl-2-nitro-5-chlorosulfonylisophthalate

Chlorine gas is passed into a stirred slurry of 6.4 g. of dimethyl-2-nitro-5-mercaptoisophthalate in a mixture of 50 ml. of acetic acid and 15 ml. of water. The temperature of the reaction rises to 70° C. as all the solid goes into solution. Introduction of chlorine is continued as a heavy precipitate forms. Stirring is continued for 15 min.; then the mixture is diluted with 300 ml. of water. The solid is collected, washed with water and dried, giving 7.5 g. of the sulfonyl chloride, m.p. 124°-125° C.

C. Dimethyl-2-nitro-5-(N-methyloctadecylsulfamoyl)isophthalate

Solid dimethyl-2-nitro-5-chlorosulfonylisophthalate (2.78 g.) is added in portions to a stirred solution of 2.5 g. of N-methyloctadecylamine and 1.0 g. of triethylamine in 50 ml. of tetrahydrofuran. After the addition the reaction is stirred at room temperature for 30 min. The precipitated amine hydrochloride is removed by filtration and the filtrate concentrated under reduced pressure. The residue is recrystallized from acetonitrile, giving 2.7 g. of product, m.p. 70°-72° C. Additional material is obtained by concentration of the mother liquor.

D. 7-carboxyl-1-methyl-5-(N-methyloctadecylsulfamoyl)-2,1-benzisoxazolin-3-one

Treatment of dimethyl-2-nitro-5-(N-methyloctadecylsulfamoyl)isophthalate with zinc using the procedure of Example 15:I-D gives 7-carboxy-5-(N-methoctadecylsulfamoyl)-2,1-benzisoxazolin-3-one methyl ester, m.p. 134°-136° C. Treatment of this material with dimethylsulfate as in Example 15:I-E above gives 7-carboxy-1-methyl-5-(N-methyloctadecylsulfamoyl)-2,1-benzisoxazolin-3-one methyl ester, m.p. 65°-68° C. Hydrolysis of the ester using the procedure of Example 15:I-F above gives 7-carboxy-1-methyl-5-(N-methyloctadecylsulfamoyl)-2,1-benzisoxazolin-3-one.

The acid chloride is prepared as in Example 15:I-G and reacted with the amine dye hydrochloride using the procedure of Example 15:II to give Compound VIII.

EXAMPLE 22

Three single-color transfer elements, containing equimolar amounts of Compounds VI, X and VIII respectively, are prepared as follows:

(1) polyethylene terphthalate film support;

(2) layer containing a negative-working silver bromide emulsion at 100 mg. Ag/ft.$^2$, gelatin at 150 mg./ft.$^2$, and respectively:

(a) Compound VI at 40.6 mg./ft.$^2$ dissolved in diethyl lauramide at 40.6 mg./ft.$^2$ for Element A, (b) Compound X at 40.0 mg./ft.$^2$ dissolved in diethyl lauramide at 40.0 mg./ft.$^2$ for Element B, and (c) Compound VIII at 42.0 mg./ft.$^2$ dissolved in diethyl lauramide at 42.0 mg./ft.$^2$ for Element C; and (3) an overcoat containing gelatin at 50 mg./ft.$^2$.

Samples of the elements are exposed through a graduated-density test object and processed at room temperature under dark conditions by rupturing a pod containing a viscous alkaline processing composition between the exposed samples and a receiving element. The receiving element is prepared as follows:

(1) polyethylene terephthalate film support;

(2) layer containing polyacrylic acid at 1440 mg./ft.$^2$;

(3) layer containing cellulose acetate at 370 mg./ft.$^2$ and copoly(styrene/maleic anhydride) at 18 mg./ft.$^2$;

(4) layer containing the mordant poly(styrene-Co-N,N,N-tri-n-hexyl-N-vinylbenzylammonium chloride) at 200 mg./ft.$^2$ and gelatin at 200 mg./ft.$^2$;

(5) layer containing titanium dioxide at 2000 mg./ft.$^2$ and gelatin at 360 mg./ft.$^2$; and (6) layer containing carbon at 250 mg./ft.$^2$ and gelatin at 156 mg./ft.$^2$.

The processing composition is as follows:

| | |
|---|---|
| potassium hydroxide | 100 g. |
| potassium bromide | 20 g. |
| 4-hydroxymethyl-4-methyl-1-phenyl-3-pyrazolidone | 3 g. |
| hydroxyethyl cellulose | 40 g. |
| water to 1 liter | |

After keeping the laminated samples of the processed elements at 140° F. (60° C.) for 16 hr., the following dye densities to red light are measured through the transparent support:

| Element | Dmax | Dmin |
|---|---|---|
| A | 2.04 | 1.49 |
| B | 2.09 | .73 |
| C | 2.09 | .86 |

The comparative tests show that improved image properties are obtained when the benzisoxazolone ring contains sulfone or sulfonamide electron-withdrawing groups thereon.

A substantially lower rate of release of the diffusible photographically useful group is observed when Elements A, B and C are processed as described above. In the areas where the immobile compound has been oxidized, substantially lower amounts of the dye have diffused to the receiver layer (Dmin areas) compared with the areas which have not been oxidized (Dmax areas). Generally, at least 50 percent more of the photographically useful group will be released in unoxidized areas than in fully oxidized areas and, when an image dye-providing material is present in the compound and sufficient compound is coated to provide a density of at least 1.5, the density difference between fully oxidized and nonoxidized areas between about 20 and 30 minutes' processing will be at least 0.5.

Although the invention has been described in considerable detail with particular reference to certain preferred embodiments thereof, variations and modifications can be effected within the spirit and scope of the invention.

We claim:

1. A compound having the formula:

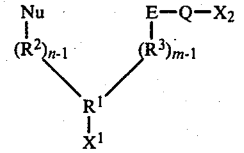

wherein $R^1$ is an aromatic group containing 5-7 members in the ring to which Nu and E are attached; $R^2$ and $R^3$ are bivalent organic groups containing from 1-3 atoms in the bivalent linkage which are alkylene, oxyalkylene or thiaalkylene; Nu is a nucleophilic group which is a hydrazine, an hydroxyamino, an hydroxy, a sulfonamido, a primary amino or alkali-labile precursors for said nucleophilic groups; E is an electrophilic group which is a carbonyl or a sulfonyl; Q is a bivalent group providing a mono atom linkage between E and $X_2$ and is amino providing a mono atom nitrogen linkage, an oxygen atom, a sulfur atom or a selenium atom, provided that Nu and E are positioned on a ring of said aromatic carbocyclic group to provide for intramolecular formation of a 5- to 7-membered ring between Nu and E displacing Q—$X_2$ from E; one of $X_1$ or Q—$X_2$ is a ballasting group containing at least 8 carbon atoms, which ballasting group is of a size sufficient to render said compound immobile in an alkaline solution-permeable layer of a photographic element; one of $X_1$ or Q—$X_2$ is an azo dye; and n and m are integers of 1 or 2.

2. A compound according to claim 1 wherein n and m are 1 with Nu and E attached directly to the aromatic ring of $R_1$.

3. A compound according to claim 1 wherein $X_1$ is said ballasting group.

4. A compound according to claim 1 wherein $X_1$ is said ballasting group and $Q-X_1$ is said azo dye.

5. A compound according to claim 1 wherein Nu is hydroxyamino.

6. A compound according to claim 1 wherein Nu is a hydrolyzable precursor for hydroxyamino.

7. A compound according to claim 1 wherein E is carbonyl and Q is said amino.

8. A compound according to claim 1 wherein $X_1$ is said ballasting group and said ballasting group contains at least 14 carbon atoms.

9. A compound according to claim 1 wherein Nu is an alkali-labile precursor for an hydroxylamino group, E is carbonyl, n and m are 1 with Nu and E attached directly to $R_1$ which is a benzenoid group, Q is said amino, $X_1$ is a ballasting group containing at least 8 carbon atoms, and $Q-X_2$ is said azo dye.

10. A compound having the formula:

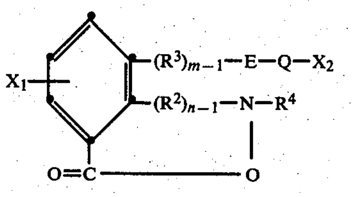

wherein $R^2$ and $R^3$ are bivalent organic groups containing from 1-3 atoms in the bivalent linkage which are alkylene, oxyalkylene or thiaalkylene; $R^4$ is alkyl containing from 1-10 carbon atoms or aryl containing from 6-20 carbon atoms; E is an electrophilic group which is a carbonyl group or a sulfonyl group; Q is a bivalent group providing a mono atom linkage between E and $X_2$ and is an oxygen atom, a sulfur atom, a selenium atom or amino providing a mono atom nitrogen linkage, provided that there are from 3-5 atoms in the linkage between the electrophilic center of E and the oxygen atom attached to the nitrogen atom shown in said formula; one of $X_1$ and $Q-X_2$ is a ballasting group containing at least 8 carbon atoms, which ballasting group is of a size sufficient to render said compound immobile in an alkaline solution-permeable layer of a photographic element; one of $X_1$ or $Q-X_2$ is an azo dye; and n and m are integers of 1 or 2.

11. A compound according to claim 10 wherein n and m are 1.

12. A compound according to claim 10 wherein E is carbonyl.

13. A compound according to claim 10 wherein $Q-X_2$ is said azo dye.

14. A compound according to claim 10 wherein $X_1$ is a ballast group having at least 14 carbon atoms therein.

15. A compound according to claim 10 wherein $R^4$ is methyl.

16. A compound according to claim 10 wherein each of n and m is 1, E is carbonyl, Q is said amino, $R^4$ is alkyl and $X_1$ is said ballasting group.

17. A compound according to claim 10 wherein each of n and m is 1, E is carbonyl, Q is said amino, $R^4$ is an alkyl group containing from 1-10 carbon atoms, $X_1$ is said ballasting group and $Q-X_2$ is said azo dye.

18. A compound according to claim 10 which has the formula:

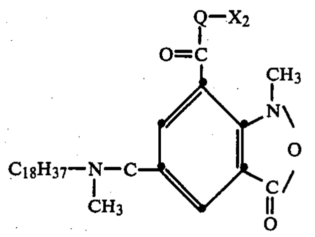

wherein Q is the group:

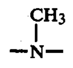

and $Q-X_2$ is said azo dye.

19. A compound having the formula:

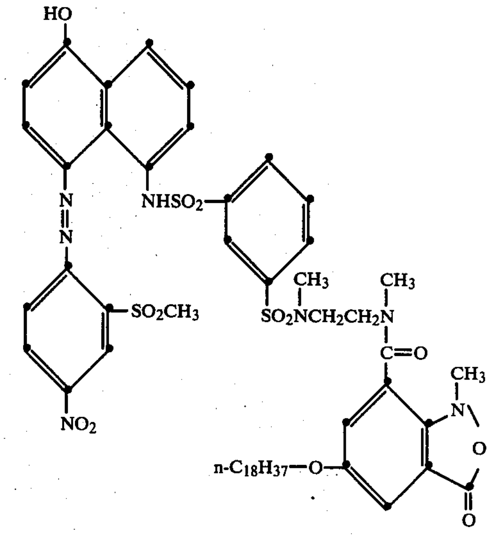

20. A compound having the formula:

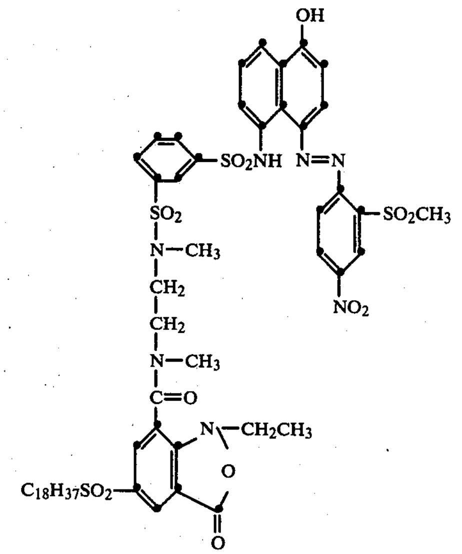

21. A compound having the formula:

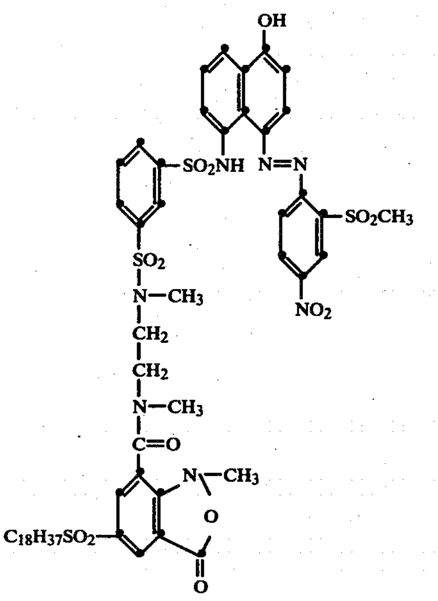

22. A compound having the formula:

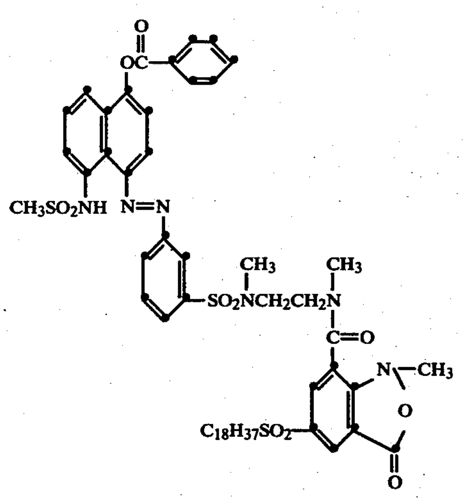

23. A compound having the formula:

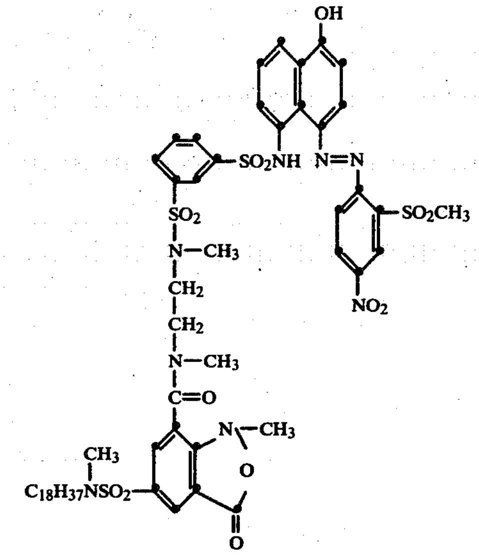

24. A compound having the formula:

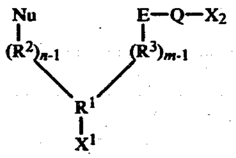

wherein $R^1$ is a benzenoid group; $R^2$ and $R^3$ are bivalent alkylenes containing from 1-3 atoms in the bivalent linkage; Nu is a nucleophilic group which is a hydrazine group of the formula:

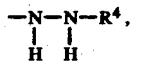

an hydroxyamino of the formula:

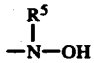

an hydroxy of the formula —OH, a primary amine of the formula $-NH_2$, a hydrolyzable precursor for an hydroxyamino of the formulae:

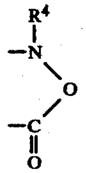

or

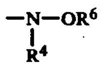

or an alkali-labile precursor for an hydroxy of the formula $-O-R^6$ where $R^4$ is alkyl containing from 1-10 carbon atoms or aryl containing from 6-20 carbon atoms, $R^5$ can be a hydrogen atom, alkyl containing from 1-10 carbon atoms or aryl containing from 6-20 carbon atoms, and $R^6$ is an hydrolyzable group containing from 2-10 carbon atoms; E is an electrophilic group which is a carbonyl or a sulfonyl; Q is a bivalent group providing a mono atom linkage between E and $X_2$ and is amino providing a mono atom nitrogen linkage, an oxygen atom, a sulfur atom or a selenium atom, provided that Nu and E are positioned on said benenzoid group to provide for intramolecular formation of a 5- to 7-membered ring between Nu and E displacing Q—$X_2$ from E, and one of $X_1$ or Q—$X_2$ is a ballasting group containing at least 8 carbon atoms, which ballasting group is of a size sufficient to render said compound immobile in an alkaline solution-permeable layer of a photographic element; one of $X_1$ or Q—$X_2$ is an azo dye; and n and m are integers of 1 or 2.

25. A compound according to claim 24 wherein n and m are 1.

26. A compound according to claim 24 wherein n and m are 1 and Nu is the group:

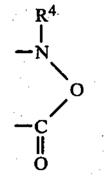

wherein $R^4$ is alkyl containing from 1-10 carbon atoms.

27. A compound according to claim 24 wherein Q—$X_2$ is said azo dye.

28. A compound according to claim 24 wherein $X_1$ is a ballasting group which is alkyl containing at least 8 carbons connected to $R^1$ through a sulfo group.

29. A compound according to claim 24 wherein n and m are 1, Q—$X_2$ is said azo dye, $X^1$ is said ballast group which contains at least 8 carbon atoms, and Nu is said alkali-labile precursor for hydroxylamino.

30. A compound having the formula:

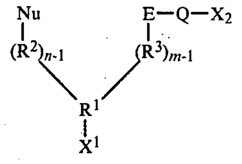

wherein $R^1$ is an aromatic carbocyclic group containing 5-7 members in the ring to which Nu and E are attached; $R^2$ and $R^3$ are bivalent organic groups containing from 1-3 atoms in the bivalent linkage which are alkylene, oxyalkylene or thiaalkylene; Nu is a nucleophilic group which is a hydrazine, an hydroxyamino, an hydroxy, a sulfonamido, a primary amino or alkali-labile precursors for said nucleophilic groups; E is an electrophilic group which is a carbonyl or a sulfonyl; Q is a bivalent group providing a mono atom linkage between E and $X_2$ and is amino providing a mono atom nitrogen linkage, an oxygen atom, a sulfur atom or a selenium atom, provided that Nu and E are positioned on a ring of said aromatic carbocyclic group to provide for intramolecular formation of a 5- to 7-membered ring between Nu and E displacing Q—$X_2$ from E; one of $X^1$ or Q—$X_2$ is a ballasting group containing at least 8 carbon atoms, which ballasting group is of a size sufficient to render said compound immobile in an alkaline solution-permeable layer of a photographic element; one of $X^1$ or Q—$X_2$ is an azo dye, an azomethine dye, an anthraquinone dye, an alizarin dye, a merocyanine dye, a quinoline dye or a cyanine dye; and n and m are integers of 1 or 2.

31. A compound according to claim 30 wherein n and m are 1, E is carbonyl, Q—$X_2$ is said dye and $X^1$ is said ballasting group.

32. A compound according to claim 30 wherein Nu is an hydroxyamino group.

33. A compound according to claim 30 wherein Nu is a hydrolyzable precursor for an hydroxyamino group.

34. A compound according to claim 30 wherein E is a carbonyl group and Q is an amino group.

* * * * *